United States Patent
Kadono et al.

(10) Patent No.: US 10,057,595 B2
(45) Date of Patent: *Aug. 21, 2018

(54) MOTION COMPENSATION METHOD, PICTURE CODING METHOD AND PICTURE DECODING METHOD

(71) Applicant: Godo Kaisha IP Bridge 1, Tokyo (JP)

(72) Inventors: Shinya Kadono, Fukuoka (JP); Satoshi Kondo, Kyoto (JP); Kiyofumi Abe, Osaka (JP)

(73) Assignee: GODO KAISHA IP BRIDGE 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,014

(22) Filed: Dec. 5, 2016

(65) Prior Publication Data

US 2017/0085905 A1    Mar. 23, 2017

Related U.S. Application Data

(60) Continuation of application No. 14/963,629, filed on Dec. 9, 2015, now Pat. No. 9,554,148, which is a
(Continued)

(30) Foreign Application Priority Data

Nov. 25, 2002 (JP) .................... 2002-340390

(51) Int. Cl.
*H04N 7/12* (2006.01)
*H04N 19/513* (2014.01)
(Continued)

(52) U.S. Cl.
CPC ......... *H04N 19/513* (2014.11); *H04N 19/122* (2014.11); *H04N 19/137* (2014.11);
(Continued)

(58) Field of Classification Search
CPC ...... G02B 21/365; G02B 21/08; G02B 21/18; G02B 21/247; G02B 21/361; G02B 21/367; G02B 7/09
See application file for complete search history.

(56) References Cited

U.S. PATENT DOCUMENTS 5,272,529 A    12/1993  Frederiksen
5,903,313 A     5/1999  Tucker et al.
(Continued)

FOREIGN PATENT DOCUMENTS

CN    1137211    12/1996
CN    1194544     9/1998
(Continued)

OTHER PUBLICATIONS

Video Coding Experts Group (VCEG). H. 26L Test Model Long Term No. 6 (TML-6) draft0. [online]. 2001. p. 1-36 [retrieved on Aug. 1, 2003]. Retrieved from the Internet:< URL:http:/kbs.cs.tu-berlin.de/_stewe/vceg/archive.htm#TML6 > p. 16-17.
(Continued)

*Primary Examiner* — Jessica M Prince
(74) *Attorney, Agent, or Firm* — Wenderoth, Lind & Ponack, L.L.P.

(57) ABSTRACT

A picture coding apparatus includes a motion vector estimation unit and a motion compensation unit. The motion vector estimation unit selects one method for deriving a motion vector of a block to be motion-compensated, depending on a motion vector of a block located in a corner of a decoded macroblock from among a group of blocks that compose the decoded macroblock corresponding to the current macroblock to be coded and determines the motion vector derived by the selected method for derivation to be a candidate of the motion vector of the current macroblock to be coded. The motion compensation unit generates a pre-
(Continued)

dictive image of the block to be motion-compensated based on the estimated motion vector.

12 Claims, 17 Drawing Sheets

Related U.S. Application Data continuation of application No. 14/740,693, filed on Jun. 16, 2015, now Pat. No. 9,241,171, which is a continuation of application No. 14/311,524, filed on Jun. 23, 2014, now Pat. No. 9,088,795, which is a division of application No. 14/046,042, filed on Oct. 4, 2013, now Pat. No. 8,897,367, which is a division of application No. 13/192,790, filed on Jul. 28, 2011, now Pat. No. 8,660,185, which is a division of application No. 10/500,575, filed as application No. PCT/JP03/10894 on Aug. 28, 2003, now Pat. No. 8,009,731.

(51) Int. Cl.
| | |
|---|---|
| *H04N 19/56* | (2014.01) |
| *H04N 19/52* | (2014.01) |
| *H04N 19/139* | (2014.01) |
| *H04N 19/176* | (2014.01) |
| *H04N 19/51* | (2014.01) |
| *H04N 19/122* | (2014.01) |
| *H04N 19/169* | (2014.01) |
| *H04N 19/61* | (2014.01) |
| *H04N 19/57* | (2014.01) |
| *H04N 19/137* | (2014.01) |
| *H04N 19/593* | (2014.01) |
| *H04N 19/557* | (2014.01) |
| *H04N 19/577* | (2014.01) |
| *H04N 19/172* | (2014.01) |
| *H04N 19/583* | (2014.01) |

(52) U.S. Cl.
CPC ......... *H04N 19/139* (2014.11); *H04N 19/169* (2014.11); *H04N 19/172* (2014.11); *H04N 19/176* (2014.11); *H04N 19/51* (2014.11); *H04N 19/52* (2014.11); *H04N 19/521* (2014.11); *H04N 19/557* (2014.11); *H04N 19/56* (2014.11); *H04N 19/57* (2014.11); *H04N 19/577* (2014.11); *H04N 19/583* (2014.11); *H04N 19/593* (2014.11); *H04N 19/61* (2014.11)

(56) References Cited

U.S. PATENT DOCUMENTS

| | | | |
|---|---|---|---|
| 6,008,852 A | 12/1999 | Nakaya | |
| 6,014,186 A | 1/2000 | Kim | |
| 6,097,842 A | 8/2000 | Suzuki et al. | |
| 6,130,913 A | 10/2000 | Yamaguchi et al. | |
| 6,178,202 B1 | 1/2001 | Nakaya | |
| 6,192,077 B1 | 2/2001 | Sugiyama | |
| 6,381,277 B1 | 4/2002 | Chun et al. | |
| 6,442,205 B1 | 8/2002 | Nakaya | |
| 6,483,874 B1 | 11/2002 | Panusopone et al. | |
| 6,483,876 B1 | 11/2002 | Chang et al. | |
| 6,483,877 B2 | 11/2002 | Nakaya | |
| 6,512,537 B1 | 1/2003 | Shimizu et al. | |
| 6,614,846 B1 | 9/2003 | Fujiwara et al. | |
| 6,618,439 B1 | 9/2003 | Kuo et al. | |
| 6,671,319 B1* | 12/2003 | Chang | H04N 5/145 348/E5.066 |
| 6,687,302 B2 | 2/2004 | Nakaya | |
| 6,771,210 B2 | 3/2004 | Nakaya | |
| 6,778,605 B1* | 8/2004 | Hamanaka | H04N 19/527 348/416.1 |
| 6,859,559 B2 | 2/2005 | Boon et al. | |
| 6,987,810 B2 | 1/2006 | Nakaya | |
| 7,020,200 B2 | 3/2006 | Winger | |
| 7,092,443 B2 | 8/2006 | Francois et al. | |
| 7,200,174 B2 | 4/2007 | Lainema et al. | |
| 7,298,781 B2 | 11/2007 | Nakaya | |
| 7,817,720 B2 | 10/2010 | Nakaya | |
| 8,036,279 B2* | 10/2011 | Isu | H04N 7/52 375/240.25 |
| 2001/0004385 A1 | 6/2001 | Okumura et al. | |
| 2001/0014178 A1 | 8/2001 | Boon | |
| 2002/0044608 A1 | 4/2002 | Nakaya | |
| 2002/0047919 A1 | 4/2002 | Kondo et al. | |
| 2002/0090135 A1 | 7/2002 | Yamaguchi et al. | |
| 2002/0130969 A1 | 9/2002 | Han et al. | |
| 2002/0181591 A1 | 12/2002 | Francois et al. | |
| 2003/0035483 A1 | 2/2003 | Nakaya | |
| 2003/0043914 A1 | 3/2003 | Nakaya | |
| 2003/0108102 A1 | 6/2003 | Demos | |
| 2003/0202603 A1 | 10/2003 | Chen et al. | |
| 2004/0032907 A1 | 2/2004 | Winger | |
| 2004/0096000 A1 | 5/2004 | Nakaya | |
| 2004/0146109 A1 | 7/2004 | Kondo et al. | |
| 2005/0111550 A1 | 5/2005 | Wang et al. | |
| 2005/0152454 A1 | 7/2005 | Wang et al. | |
| 2005/0226336 A1 | 10/2005 | Nakaya | |
| 2006/0083311 A1 | 4/2006 | Winger | |
| 2008/0025404 A1 | 1/2008 | Nakaya | |
| 2010/0284463 A1 | 11/2010 | Nakaya | |
| 2010/0284470 A1 | 11/2010 | Nakaya | |

FOREIGN PATENT DOCUMENTS

| | | |
|---|---|---|
| JP | 2000-253407 | 9/2000 |
| JP | 2000-308066 | 11/2000 |
| JP | 2001-251627 | 9/2001 |
| TW | 480885 | 1/1991 |
| TW | 421972 | 2/2001 |
| TW | 423257 | 2/2001 |
| WO | 01/95633 | 12/2001 |

OTHER PUBLICATIONS

"Information technology—Coding of audio—visual objects—Part 2: Visual", ISO/IEC 14496-2, Second Edition, Dec. 1, 2001, pp. ii-517.

"H.26L Test Model Long Term No. 8 (TML-8) Draft0", ITU-T Telecommunication Standardization Sector of ITU, Geneva, CH, Apr. 2, 2001, pp. 1-54, XP001089814.

Dong-Wook Kim et al., "Adaptive motion estimation based on spatio-temporal correlation", Signal Processing, Image Communication, Elsevier Science Publishers, Amsterdam, NL, vol. 13, No. 2, Aug. 1998, pp. 161-170, XP004129635.

Michael C. Chen et al., "Design and Optimization of a Differentially Coded Variable Block Size Motion Compensation System", Proceedings of the International Conference on Image Processing (ICIP) Lausanne, Sep. 16-19, 1996, New York, IEEE, US, vol. 1, Sep. 16, 1996, pp. 259-262, XP010202380.

Information technology—Coding of audio-visual object Part 2: Visual ISO/IEC 14496-2 Second edition Dec. 1, 2001 pp. x, 8, 210-213, 218-219.

Summons to Attend Oral Proceedings issued Mar. 5, 2010 in corresponding European Patent Application No. 03811870.9.

Tourapis, Alexis Michael, "Performance comparison of Temporal and Spatial Direct mode", Joint Video Team (JVT) of ISO/IEC MPEG & ITU-T VCEG, 5th Meeting: Geneva, Switzerland, Oct. 9-17, 2002.

European Office Action dated Dec. 10, 2010 issued in connection with corresponding European Application No. 03811870.9.

Canadian Office Action dated Dec. 3, 2010 issued in connection with corresponding Canadian Application No. 2,473,897.

(56) References Cited

OTHER PUBLICATIONS

Winger, "Reduced Decoder Peak Bus Bandwith", Joint Video Team (JVT) of ISO/IEC MPEG & ITU-T VCEG (ISO/IEC JTC1/SC29/WG11 and ITU-T SG16 Q.6) 3rd Meeting: May 2002, p. 1-7.
Tourapis, "8×8 Block Restriction to Spatial Direct Mode," Joint Video Team (JVT) of ISO/IEC MPEG & ITU-T VCEG (ISO/IEC JTC1/SC29/WG11 and ITU-T SG16 Q.6) 6th Meeting: Dec. 2002, p. 1-7.
Chinese Notice of Completing Formalities for Patent Registration (and English translation thereof) dated Aug. 31, 2012 in Chinese Application 201010002129.8.
European Communication under Rule 71(3) EPC dated Jan. 29, 2013 in European Application No. 08 100 041.6.
Winger, "Reduced Decoder Peak Bus Bandwith," Joint Video Team (JVT) of ISO/IEC MPEG & ITU-T VCEG (ISO/IEC JTC1/SC29/WG11 and ITU-T SG16 Q.6) 3rd Meeting: Fairfax, Virginia, USA, May 6-10, 2002, Document: JVT-C115, Filename: JVT-C115r2.doc, pp. 1-7.
Tourapis et al., "8×8 Block Restriction to Spatial Direct Mode", Joint Video Team (JVT) of ISO/IEC MPEG & ITU-T VCEG (ISO/IEC JTC1/SC29/WG11 and ITU-T SG16 Q.6) 6th Meeting: Awaji, Island, JP, Dec. 5-13, 2002, Document: JVT-F025, Filename: JVT-F025.doc, pp. 1-7, 1-48, 1-2 and 1-17.
Notice of Allowance dated Jul. 8, 2014, in U.S. Appl. No. 14/046,058.
Notice of Allowance dated Jul. 28, 2014, in U.S. Appl. No. 14/046,042.
Extended European Search Report dated Jul. 10, 2015 in corresponding European Patent Application No. 15161516.8.
Tourapis et al., "Timestamp Independent Motion Vector Prediction for P and B frames with Division Elimination", Joint Video Team (JVT) of ISO/IEC MPEG & ITU-T VCEG (ISO/IEC JTC1/SC29/WG11 and ITU-T SG16 Q.6) 4th Meeting: Klagenfurt, Austria, Jul. 22-26, 2002, Document: JVT-D040, Filename: JVT-D040.doc, XP030005314, sections 3-5.
Byeong-Moon Jeon et al., "B Pictures in JVT", Joint Video Team (JVT) of ISO/IEC MPEG & ITU-T VCEG (ISO/IEC JTC1/SC29/WG11 and ITU-T SG16 Q.6) 4th Meeting: Klagenfurt, Austria, Jul. 22-26, 2002, Document: JVT-D155, Filename: JVT-D155.doc, XP030005418, 19 pages total.
Tourapis, Alexis Michael et al., "Performance comparison of Temporal and Spatial Direct mode", Joint Video Team (JVT) of ISO/IEC MPEG & ITU-T VCEG (ISO/IEC JTC1/SC29/WG11 and ITU-T SG16 Q.6), 5th Meeting: Geneva, Switzerland, Oct. 9-17, 2002.
Wiegand, Thomas, Editor's Proposed Draft Text Modifications for Joint Video Specification (ITU-T Rec. H.264 ISO/IEC 14496-10 AVC), Geneva modifications draft 37, Joint Video Team (JVT) of ISO/IEC MPEG and ITU-T VCEG, 5th Meeting: Geneva, Switzerland, Oct. 9-17, 2002.
Wiegand, Thomas et al., "AHG report of Text Editing and Software Integration," Joint Video Team (JVT) of ISO/IEC MPEG & ITU-T VCEG (ISO/IEC JTC1/SC29/WG11 and ITU-T SG16 Q.6), 6th Meeting: Awaji, Island, JP, Dec. 5-13, 2002.
Zhong, Sheng, "Minimum Luma Block Size Level Limit for Direct mode Macroblocks", Joint Video Team (JVT) of ISO/IEC MPEG & ITU-T VCEG (ISO/IEC JTC1/SC29/WG11 and ITU-T SG16 Q.6), 6th Meeting: Awaji, Island, JP, Dec. 5-13, 2002.

* cited by examiner

Current macroblock to be coded

Current block to be motion-compensated

→ Display order

Current macroblock to be coded

Macroblock in a subsequent picture which is co-located with a current macroblock

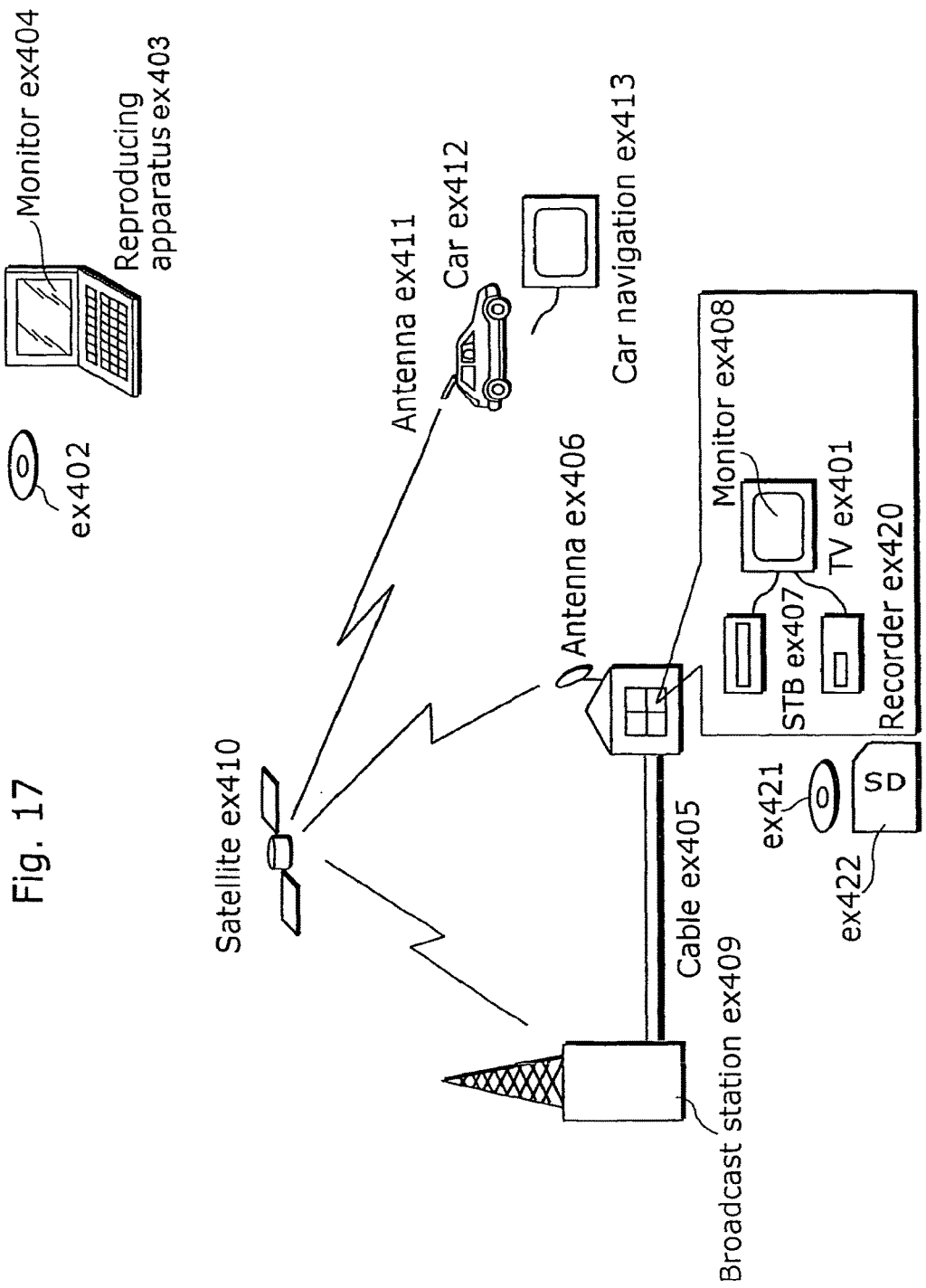

MOTION COMPENSATION METHOD, PICTURE CODING METHOD AND PICTURE DECODING METHOD

BACKGROUND OF THE INVENTION

Technical Field

The present invention relates to a motion compensation method using motion vectors and picture coding, and decoding methods using the motion compensation method.

Background Art

In recent years, accompanied by the development of multimedia applications, it is becoming universal to deal with media information as a whole such as a picture, a voice and a text. At this time, it is possible to deal with the media uniformly by digitizing the entire media. However, the digitized picture has an extremely large amount of data and therefore a technology for compressing picture information is indispensable. On the other hand, it is also important to standardize compression technology to interoperate compressed picture data. As standards of picture compression technology, there are H. 261 and H. 263 of ITU-T (International Telecommunication Standardization Section), MPEG (Moving Picture Experts Group)-1, MPEG-2, MPEG-4 and the like of ISO/IEC (International Standardization Organization/International Electrotechnical Commission).

Generally, information volume is compressed by reducing redundancy in temporal and spatial directions of moving picture coding. Therefore, for interpicture prediction coding aimed at reducing temporal redundancy, motion estimation and generation of a predictive picture are performed on a block-by-block basis by referring to a preceding picture and a following picture Coding is performed for a difference value between an obtained predictive image and an image of a current macroblock to be coded. Here, a picture is a term to represent one screen; it means a frame in a progressive picture and a frame or a field in an interlace picture. Here, an interlace picture is a picture in which one frame is formed with two fields with different time. In a coding and decoding process of an interlace picture, it is possible to process one frame as a frame "as is" or two fields. Also it is possible to process one frame structure or one field structure for each block in the frame.

A picture that does not have a reference picture and in which intrapicture prediction coding is performed is called an "I picture." Additionally, a picture in which only one picture is referred and interpicture prediction coding is performed is called a "P picture." Moreover, a picture in which two pictures are referred at one time and interpicture coding can be performed is called a "B picture." In a B picture, two pictures can be referred as an arbitrary combination from forward pictures or backward pictures in display order. It is possible to select appropriate reference pictures for each block that is a basic unit for coding and decoding. Two reference pictures are distinguished: a reference picture that is described earlier in a coded bit stream is the first reference picture, and a reference picture that is described later in the coded bit stream is the second reference picture. But it is necessary that the reference pictures are already coded or decoded as a condition in the case of coding and decoding these pictures.

To code a P picture or a B picture, interpicture prediction coding using motion compensation is used. The interpicture prediction coding using motion compensation is a coding method in which motion compensation is applied to interpicture prediction. Motion compensation is a method that does not simply perform prediction based on pixel values of a block in a reference frame co-located with a current block but estimates a motion amount (hereinafter, called a "motion vector") of each part and performs prediction considering the motion amount to improve predictive accuracy and reduce data amount. For example, estimating a motion vector of a current picture to be coded, obtaining a predictive value that has been shifted by the amount of the motion vector and coding a predictive residual (that is the difference between the predictive value and a pixel value of each pixel in the current picture to be coded), successfully reduce the data amount. In the case of this method, information of a motion vector is necessary at the time of decoding and therefore the motion vector is also coded and recorded, or transmitted.

The motion vector is estimated on a block-by-block basis, the blocks having a predetermined size. Concretely, the motion vector is estimated by moving each block in a reference picture corresponding to each block in a current picture to be coded in a search area and by detecting the location of the reference block that is most similar to the current block to be coded.

FIG. 1 is a block diagram showing the structure of a conventional picture coding apparatus 100. The picture coding apparatus 100 includes a difference unit 101, an image coding unit 102, a variable length coding unit 103, an image decoding unit 104, an addition unit 105, a picture memory 106, a picture memory 107, a motion compensation unit 108, a motion vector estimation unit 109 and a motion vector storage unit 110. Here, as for motion compensation, an appropriate block size is selected on a macroblock-by-macroblock basis from seven block sizes and used for coding and decoding, the seven block sizes being 4×4 pixels, 4×8 pixels, 8×4 pixels, 8×8 pixels, 8×16 pixels, 16×8 pixels and 16×16 pixels according to ITU-T H.26L TML8, which is currently under standardization.

The picture memory 107 stores image data "Img" that represents moving pictures inputted in the display order on a picture-by-picture basis. The difference unit 101 calculates the difference between the image data "Img" read out from the picture memory 107 and predictive image data "Pred" inputted from the motion compensation unit 108 and generates predictive residual image data "Res". The image coding unit 102 performs coding processes such as frequency conversion and quantization to the inputted predictive residual image data "Res" and generates coded residual data "CodedRes". In the case of intrapicture coding, interpicture motion compensation is not performed and therefore the value of the predictive image data "Pred" is thought to be "0."

The motion vector estimation unit 109 estimates the motion vector that shows the location predicted to be optimum in the search area in the reference picture that is reference picture data "Ref," which is coded decoding picture data stored in the picture memory 106 and outputs a motion parameter "MotionParam" that represents the estimated motion vector. In addition, at that time, the motion vector estimation unit 109 switches reference pictures according to whether a current picture to be coded is a P picture or a B picture. Coding mode "Mod" shows in which way (for example, which one of a bi-predictive mode, a unidirectional mode and a direct mode) motion compensation is performed. For example, in the direct mode, the motion vector estimation unit 109 calculates bi-predictive motion vectors of the current block to be motion-compensated by using a motion vector derived from another block. Here, a picture referred to derive a motion vector in the direct mode is called a standard picture and a block in the standard picture co-located with the current block is called a standard block. In this case, values of motion vectors in the direct mode are calculated with a 16×16-pixel macroblock as the unit regardless of the block size that is actually the unit for motion compensation, and the calculated motion vectors are not coded. Then, the motion vector estimation unit 109 chooses either the calculated motion vector or the motion vector (0, 0) to be used for each 4×4-pixel block. The motion compensation unit 108 generates the predictive image data "Pred" based on the coding mode "Mod" of the current block to be coded and the motion vectors estimated by the motion vector estimation unit 109.

Further, when a motion vector indicates sub-pixel locations such as a half pixel and a quarter pixel, the motion compensation unit 108 interpolates pixel values of the sub-pixel locations such as a half pixel and a quarter pixel by using a low-pass filter and the like. The motion vector storage unit 110 stores motion parameters "MotionParam" outputted from the motion vector estimation unit 109. The variable length coding unit 103 performs variable length coding and the like to the inputted coded residual data "CodedRes" and the motion parameters "MotionParam" outputted from the motion vector estimation unit 109 and generates coded data "Bitstream" by further adding the coding mode "Mod".

The image decoding unit 104 performs decoding processes such as inverse quantization and inverse frequency conversion to the inputted coded residual data "CodedRes" and generates decoded residual data "ReconRes." The addition unit 105 adds the decoded residual data "ReconRes" outputted from the image decoding unit 104 to the predictive image data "Pred" inputted from the motion compensation unit 108 and generates decoded image data "Recon." The picture memory 106 stores the generated decoded image data "Recon."

When the motion amount of a photogenic subject is smaller than an integer pixel unit, a predictive effect may improve if the prediction is performed with a movement that is smaller than the integer pixel unit. Generally, pixel interpolation is used when calculating pixel values of a predictive image with the movement that is smaller than the integer pixel unit. This pixel interpolation is performed by filtering pixel values of a reference picture with a linear filter (a low-pass filter). When increasing the number of taps of this linear filter, it is easier to realize a filter with good frequency characteristics and therefore the predictive effect improves but a processing amount increases. On the other hand, when the number of taps of this linear filter is small, the frequency characteristics become worse and therefore the predictive effect deteriorates but the processing amount decreases.

FIG. 2 is a diagram showing the structure of a conventional picture decoding apparatus 200 that performs pixel interpolation. The picture decoding apparatus 200 includes a variable length decoding unit 201, an image decoding unit 202, an addition unit 203, a picture memory 204, a motion vector storage unit 205 and a motion compensation unit 206.

The variable length decoding unit 201 extracts various data such as the coded residual data "CodedRes", motion parameters "MotionParam" and information of the coding mode "Mod" at the time of coding from the inputted coded data "Bitstream". The image decoding unit 202 decodes the inputted coded residual data "CodedRes" and generates predictive residual image data "Res". The motion vector storage unit 205 stores the motion parameters "MotionParam" extracted by the variable length decoding unit 201.

The motion compensation unit 206 includes an inside pixel interpolation unit (not illustrated) that interpolates pixel values of the sub-pixel locations such as a half pixel and a quarter pixel by using a linear filter and the like. The motion compensation unit 206 generates predictive image data "Pred" that is motion compensation data from the decoded image data "Recon" in the picture memory 204 based on the coding mode "Mod" at the time of coding, motion parameters "MotionParam" and the like. At this time, in the case of the direct mode, the motion compensation unit 206 generates the predictive image data "Pred" of the current block to be motion-compensated in the same size with the block size of motion compensation of a standard block in a standard picture, read out from the picture memory 204. The addition unit 203 adds the predictive residual image data "Res" outputted from the image decoding unit 202 to the predictive image data "Pred" that is motion compensation data outputted from the motion compensation unit 206 and generates the decoded image data "Recon." The picture memory 204 stores the generated decoded image data "Recon." Refer to MPEG-4 Visual written standards (1999, ISO/IEC 14496-2: 1999 Information technology—Coding of audio-visual objects-Part2: Visual)

To perform motion compensation of sub-pixel precision, however, it is necessary to obtain pixel values of not only the current block to be motion-compensated but also some adjacent pixels. In other words, to generate pixel values of sub-pixel precision, it is necessary to obtain the pixel values of a larger area than the actual block to be predicted. It is common practice to use a low-pass filter in order to generate pixel values by an interpolation process; it is necessary to access (read out) some adjacent pixels (pixels for a number of coefficients of the low-pass filter) to a target pixel in order to use the low-pass filter. FIGS. 3A and 3B are diagrams showing examples of a current block to be motion-compensated and its adjacent pixels, whose pixel values are necessary to be read out in order to generate a predictive image when performing pixel interpolation. FIG. 3A is a diagram showing the current block to be motion-compensated and its adjacent pixels when the current block to be motion-compensated is small. FIG. 3B is a diagram showing the current block to be motion-compensated and its adjacent pixels when the current block to be motion-compensated is large. In FIGS. 3A and 3B, the central square shows one current block to be motion-compensated while the surrounding hatched area shows the adjacent pixels whose pixel values are read out from a reference memory in order to perform pixel interpolation. Here, for example, when a filter of 9 taps (pixel values of nine pixels are necessary) is assumed to be used as a low-pass filter, in order to perform low-pass filter process to pixels in the border area of the block, it is necessary to obtain the pixel values of at least four pixels outside the block and therefore a memory must be accessed to read out the area including the pixel values of four pixels surrounding the central current block to be motion-compensated. For example, in a 4×4-pixel block, it is necessary to read out the pixel values of (4+4+4)×(4+4+4)=144 pixels for each block. In an 8×8-pixel block, it is necessary to read out the pixel values of (4+8+4)×(4+8+4)=256 pixels. When motion-compensating a 16×16-pixel macroblock with an 8×8-pixel block as the unit, it is enough to read out the pixel values of 256 pixels×4=1024 pixels but when motion-compensating the 16×16-pixel macroblock with a 4×4-pixel block as the unit, it is necessary to read out the pixel values of 144 pixels×16=2304 pixels. Consequently, the memory access amount of the motion compensation with an 8×8- pixel block as the unit is about half of that of four motion compensations with a 4×4-pixel block as the unit.

As is apparent from the above-mentioned example, when reading out the pixel values of the same number of external pixels surrounding one current block to be motion-compensated, the smaller the size of the current block to be motion-compensated, the larger the ratio of the number of pixels in adjacent blocks to the number of pixels in the current block to be motion-compensated (concerning the number of pixels read out from a reference memory). As a result, when reading out the pixel values of the current block to be motion-compensated from the reference memory, there is a problem that the load of memory access (access for reading out) becomes large by referring to the adjacent pixels that are not the target of motion compensation. Particularly, when performing the bi-predictive motion compensation of a B picture whose pixel values are calculated by motion-compensating the current picture to be coded or decoded referring to two pictures at the same time, the access to the reference memory becomes about double compared with unidirectional predictive motion compensation. Therefore, a problem of overhead becomes more prominent when the size of the current block to be motion-compensated is small.

SUMMARY OF INVENTION

It is a first object of the present invention to provide a motion compensation method for reducing the access to the reference memory.

Additionally, it is a second object of the present invention to provide a picture coding method and a picture decoding method using the motion compensation method.

To achieve the above-mentioned objects, the motion compensation method according to the present invention is a motion compensation method for coding or decoding an image signal, the motion compensation method comprising: a selection step of selecting one of methods for generating a motion vector of a block in a current macroblock to be coded or decoded, depending on a motion vector of a block located in a corner of a coded or decoded macroblock among a group of blocks that compose the coded or decoded macroblock corresponding to the current macroblock; and a motion compensation step of generating a predictive image of the block in the current macroblock based on the motion vector generated by the selected method. Herewith, though a group of coded or decoded blocks that compose a plurality of blocks corresponding to one current block to be motion-compensated, by judging motion of one block located in the four corners of the macroblock including said group of blocks, it is possible to select a method for generating a motion vector used to motion-compensate the current block to be motion-compensated.

Moreover, since the picture coding apparatus and the picture decoding apparatus motion-compensate with a larger size of the current block to be motion-compensated as the unit, it is possible, for example, to reduce the overhead by access to a picture memory in coding and decoding a B picture using the bi-predictive motion compensation.

In addition, the present invention can be realized not only as a motion compensation method, a picture coding method and a picture decoding method, but also as a picture coding apparatus and a picture decoding apparatus using the characteristic steps included in the these methods, and as a program for causing a computer to execute these steps. Additionally, it is needless to say that the program can be distributed through a recording medium such as a CD-ROM and a transmission medium such as the Internet.

BRIEF DESCRIPTION OF DRAWINGS

FIG. 17 is a diagram showing an example of a digital broadcasting system.

DETAILED DESCRIPTION OF THE INVENTION

The embodiments of the present invention will be explained in detail below with reference to FIGS. 4 to 17.

The First Embodiment

The first embodiment of the present invention will be explained in detail below with reference to the figures.

Figure 1:
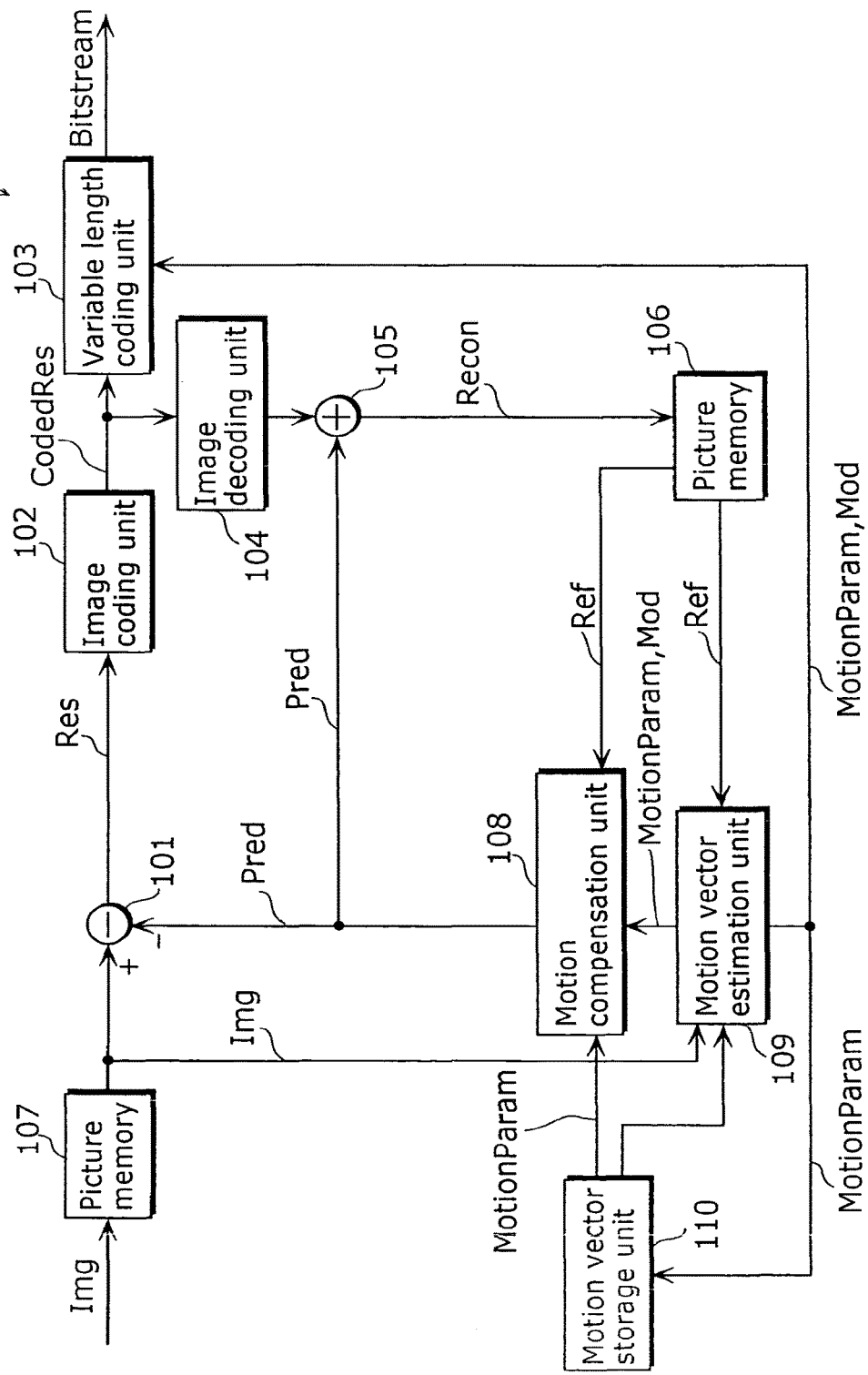
FIG. 1 is a block diagram showing the structure of a conventional picture coding apparatus 100.
Figure 2:
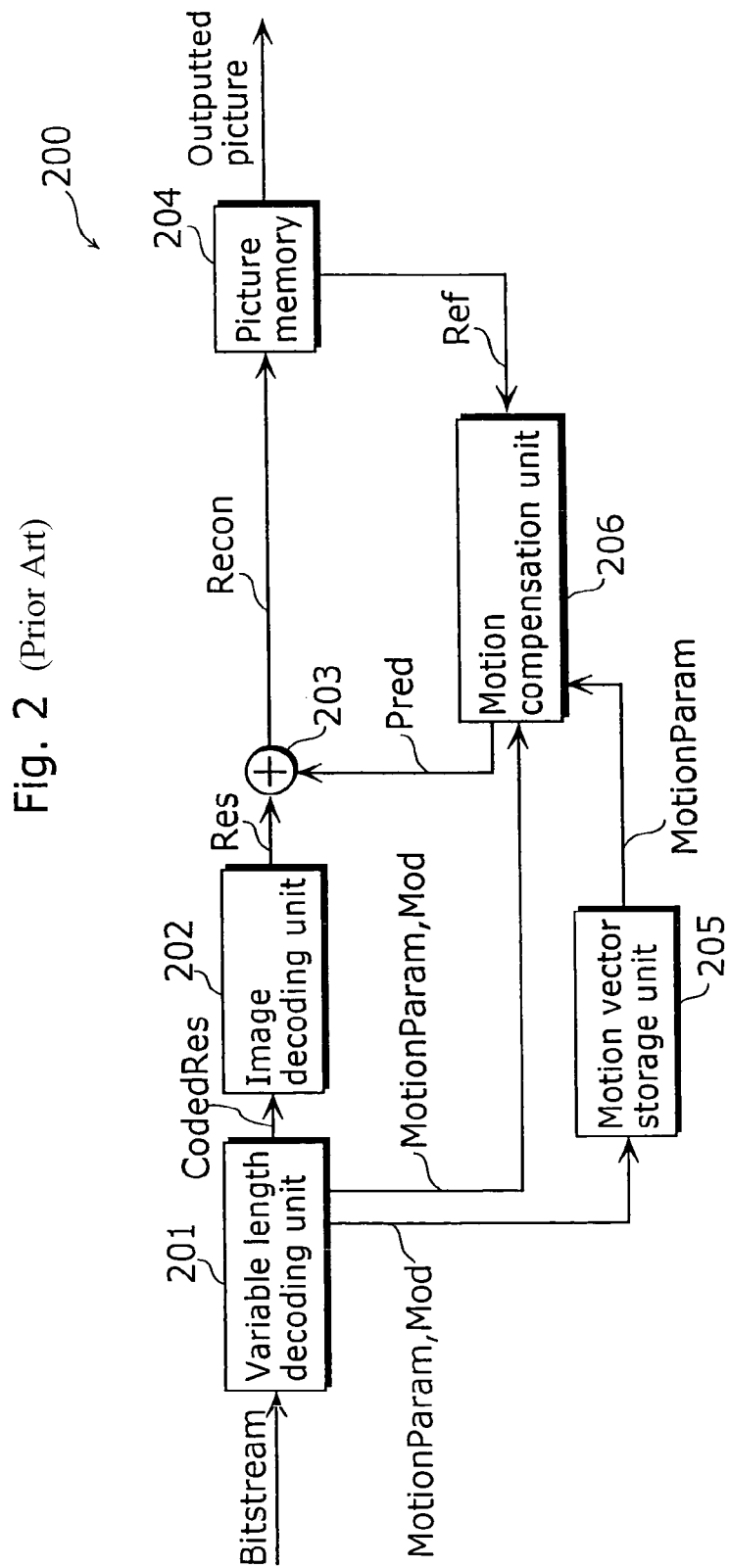
FIG. 2 is a diagram showing the structure of a conventional picture decoding apparatus 200 that performs pixel interpolation.
Figure 3B:
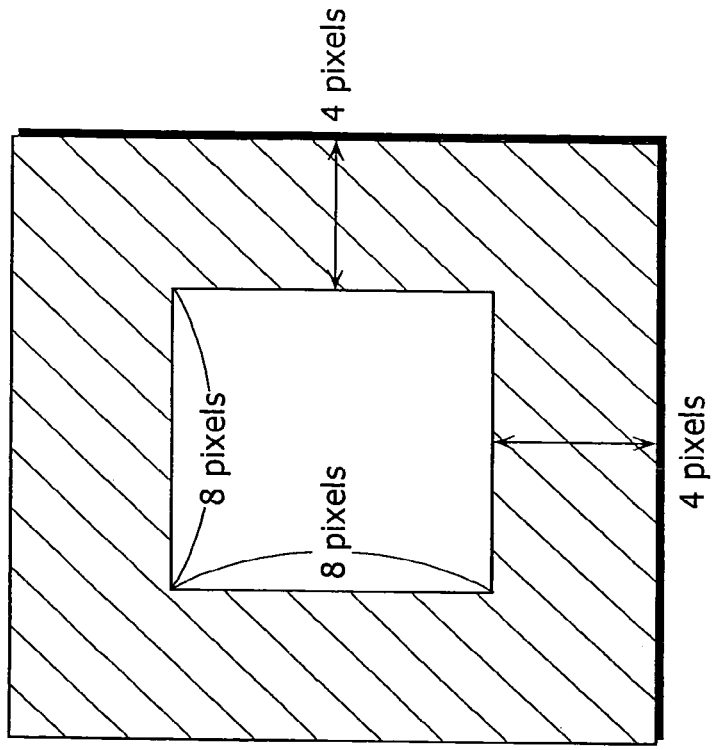
FIGS. 3A and 3B are diagrams showing examples of a current block to be motion-compensated and its adjacent pixels, which are necessary to read out the pixel values of which in order to generate a predictive image when performing pixel interpolation.
Figure 3A:
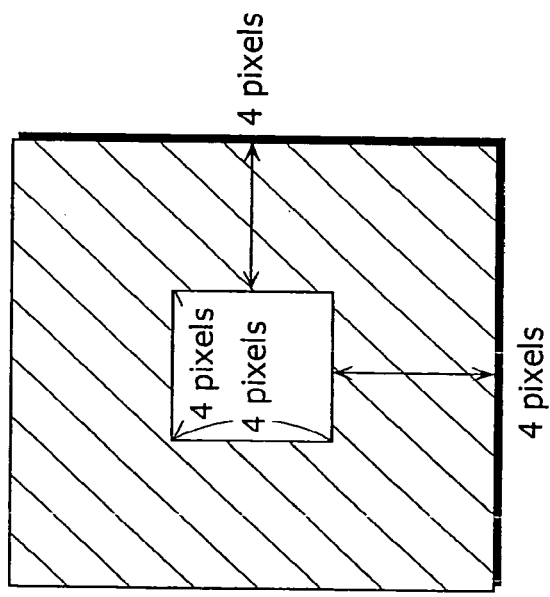
Figure 4:
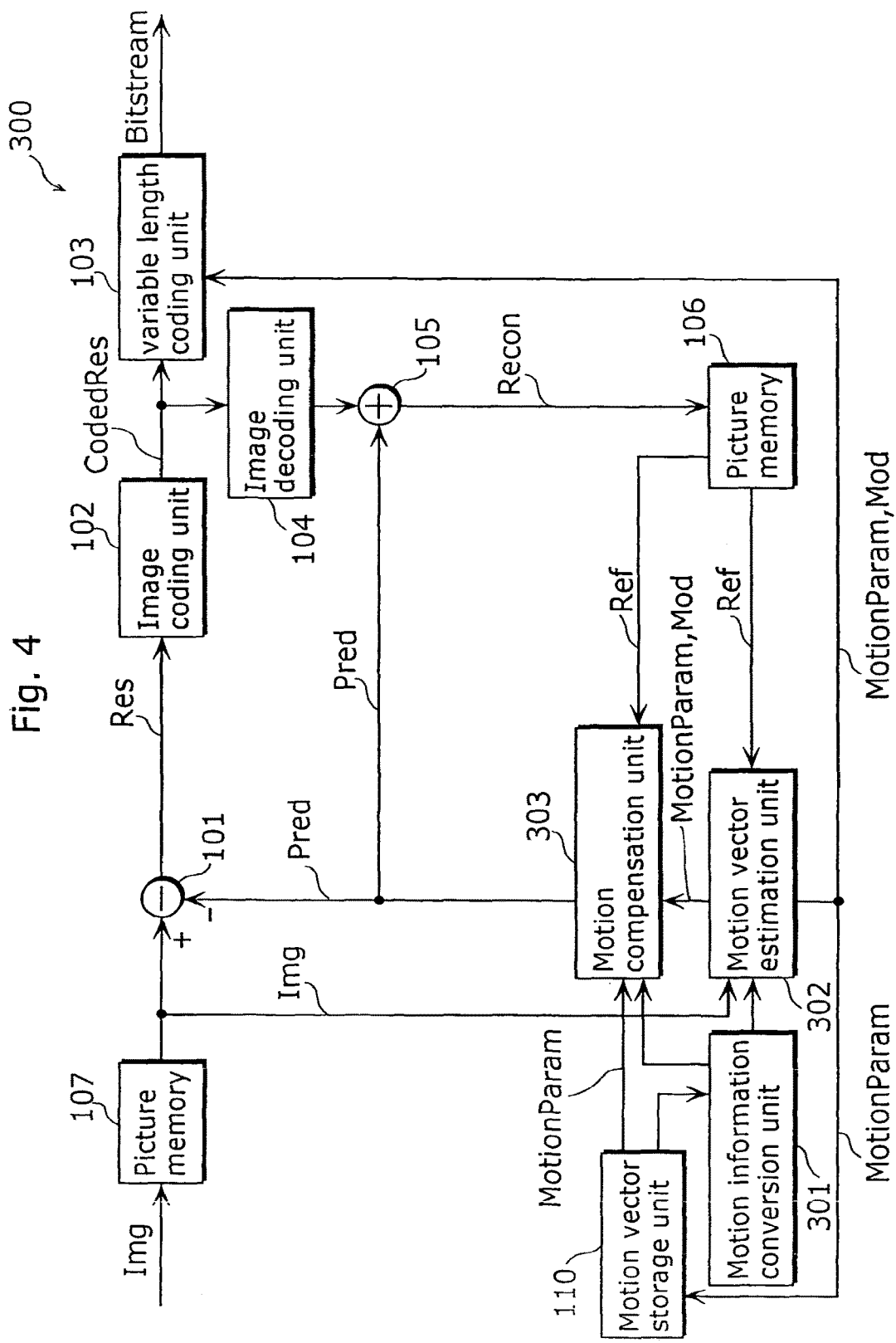
FIG. 4 is a diagram showing the structure of a picture coding apparatus 300 according to one embodiment using the picture coding method according to the present invention.

FIG. 4 is a diagram showing the structure of a picture coding apparatus 300 according to one embodiment using a picture coding method according to the present invention. The picture coding apparatus 300 is a picture coding apparatus that performs motion compensation of a B picture (to be coded) in a larger block size than the block size of motion compensation of a P picture referring to two pictures. The picture coding apparatus 300 includes a difference unit 101, an image coding unit 102, a variable length coding unit 103, an image decoding unit 104, an addition unit 105, a picture memory 106, a picture memory 107, a motion vector storage unit 110, a motion information conversion unit 301, a motion vector estimation unit 302 and a motion compensation unit 303.

The picture memory 107 stores image data "Img" that represents moving pictures inputted in the display order on a picture-by-picture basis. The difference unit 101 calculates the difference between the image data "Img" read out from the picture memory 107 and the predictive image data "Pred" inputted from the motion compensation unit 303 and generates predictive residual image data "Res." Here, in the case of intrapicture coding, interpicture motion compensation is not performed. And therefore the value of the predictive image data "Pred" is thought to be "0." The image coding unit 102 performs coding processes such as frequency conversion and quantization to the inputted predictive residual image data "Res" and generates the coded residual data "CodedRes." When the current picture to be coded is a B picture, the motion information conversion unit 301 derives motion vectors and informs the motion vector estimation unit 302 and the motion compensation unit 303 so that motion compensation is performed in a predetermined block size. In other words, in the case of a B picture, under the condition accepting the unidirectional prediction mode, the bi-predictive mode and the direct mode, the picture coding apparatus 300 performs motion compensation in the bi-directional mode and the direct mode in a large block size (for example, estimating motion vectors in a block size smaller than an 8×8-pixel block is prohibited); in the case of a P picture, the unidirectional prediction in a small block size is allowed. Hereby, particularly in the bi-predictive mode that accesses the memory often, selection of motion vectors that refer to reference pictures in a small block size is incapable. Moreover, the motion information conversion unit 301 converts motion parameters of reference pictures stored in the motion vector storage unit 110 into motion parameters (such as motion vectors) with a predetermined block size (for example, an 8×8-pixel block), or instructs the motion vector estimation unit 302 and the motion compensation unit 303 to make an interpretation of the motion parameters corresponding to this conversion.

Using the reference picture data "Ref" that is decoded data of coded pictures stored in the picture memory 106 as a reference picture, the motion vector estimation unit 302 estimates the motion vector that indicates the location of the block predicted to be optimum in the search area in the reference picture, and outputs motion parameters "MotionParam" including the estimated motion vector. The motion vector storage unit 110 stores the motion parameters "MotionParam" outputted from the motion vector estimation unit 302.

Furthermore, responding to whether the current picture to be coded is a P picture or a B picture, the motion vector estimation unit 302 evaluates errors indicated by the cases of motion-compensating in the coding modes "Mod," and compares the motion compensation error when a search is conducted in the reference picture with the motion compensation error when deriving motion vectors in the direct mode, the unidirectional predictive mode and the bi-predictive mode. In other words, in the direct mode, depending on motion vectors, which are converted by the motion information conversion unit 301 (converted, for example, to a block size that is an 8×8 block or larger), and the motion-compensated block in a subsequent block which is co-located with the current block to be motion-compensated, a motion vector in the current block to be motion-compensated is selected from among a plurality of motion vectors. By the way, the direct mode is a bi-predictive mode for calculating the motion vector of the current block to be motion-compensated using a motion vector derived from another block and for not coding the motion vector in the current block to be motion-compensated. The size of the motion vector in the block in a subsequent picture co-located with a current block decides which one of the derived motion vector and the motion vector (0, 0) is used. (The information for identifying which one is selected is not coded.) Furthermore, the block in a subsequent picture which is co-located with a current block is the block (the standard block) in the nearest backward picture (the standard picture) to the current picture to be coded in the display order.

The motion compensation unit 303 generates the predictive image data "Pred" based on this coding mode "Mod" and the motion vector estimated by the motion vector estimation unit 302. In the direct mode of a B picture, the motion compensation unit 303 generates predictive pictures for each 8×8-pixel current block to be motion-compensated, using the motion vector calculated by the motion vector estimation unit 302. In addition, when the motion vector indicates sub-pixel locations such as a half pixel and a quarter pixel, the motion compensation unit 303 interpolates the sub-pixel locations such as a half pixel and a quarter pixel using a linear filter (a low-pass filter) and the like. In this case, since motion vectors with small block sizes are not selected by the motion vector estimation unit 302 in the bi-predictive mode, the motion compensation unit 303 can perform motion compensation with relatively large block sizes that do not have many accesses in the bi-predictive mode. Additionally, in the unidirectional mode, the motion vector estimation unit 302 and the motion compensation unit 303 perform motion compensation that enables motion compensation with small block sizes. The variable length coding unit 103 performs variable length coding and the like to the inputted coded residual data "CodedRes" and the motion parameters "MotionParam" outputted from the motion vector estimation unit 302, and generates the coded data "Bitstream" by further adding the coding mode "Mod."

The image decoding unit 104 performs decoding processes such as inverse quantization and inverse frequency conversion to the inputted coded residual data "CodedRes" and generates decoded residual data "ReconRes." The addition unit 105 adds the decoded residual data "ReconRes" outputted from the image decoding unit 104 to the predictive image data "Pred" inputted from the motion compensation unit 303 and generates the decoded image data "Recon." The picture memory 106 stores the generated decoded image data "Recon".

Figure 5:
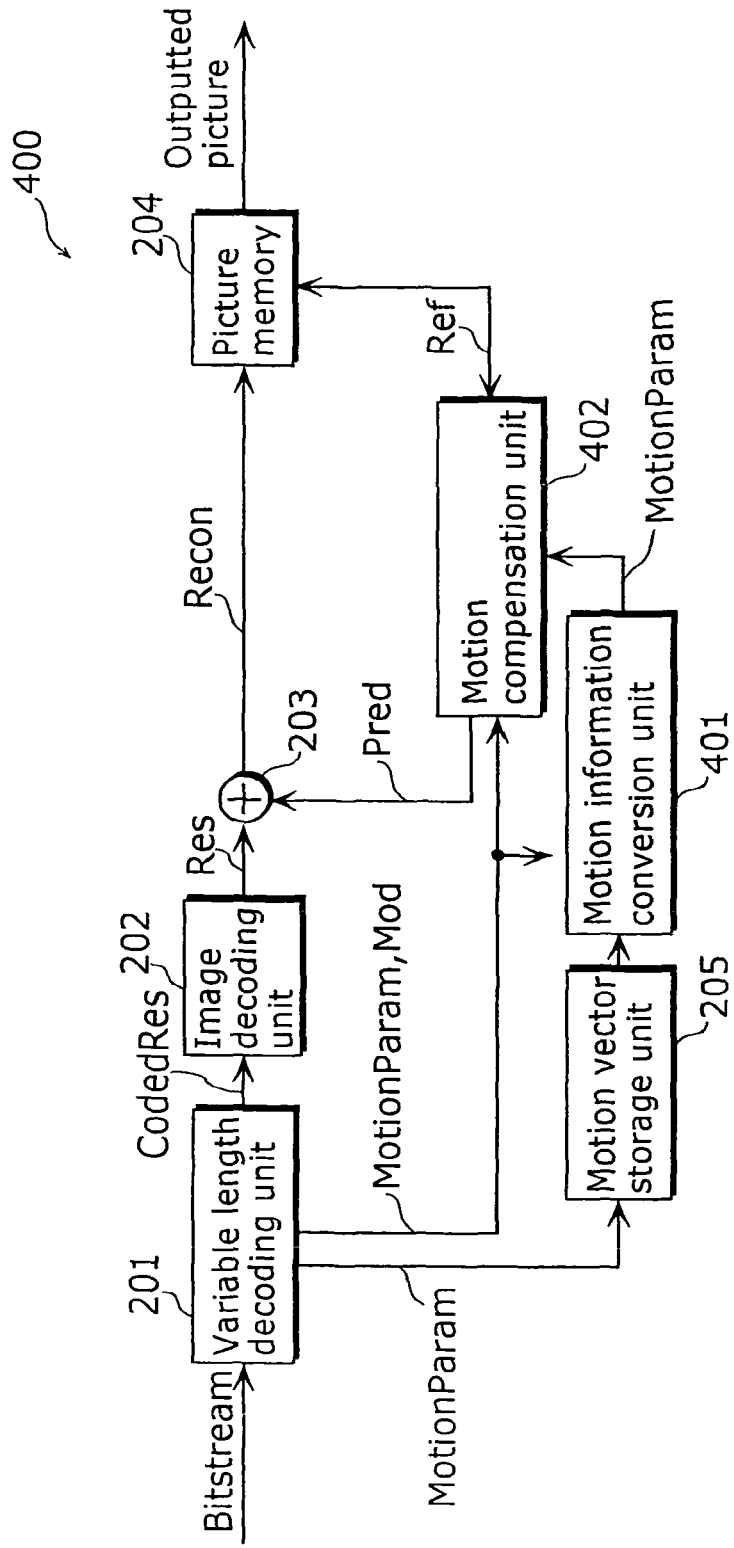
FIG. 5 is a block diagram showing the structure of a picture decoding apparatus 400 according to one embodiment using the picture decoding method according to the present invention.

FIG. 5 is a block diagram showing the structure of a picture decoding apparatus 400 according to one embodiment using the picture decoding method according to the present invention. The picture decoding apparatus 400 includes a variable length decoding unit 201, an image decoding unit 202, an addition unit 203, a picture memory 204, a motion vector storage unit 205, a motion information conversion unit 401 and a motion compensation unit 402.

The variable length decoding unit 201 extracts various data such as the coded residual data "CodedRes", motion parameters "MotionParam" and information of the coding mode "Mod" used at the time of coding from the inputted coded data "Bitstream." The image decoding unit 202 decodes the inputted coded residual data "CodedRes" and generates predictive residual image data "Res." The motion information conversion unit 401 converts motion parameters of reference pictures read out from the motion vector storage unit 205 into motion parameters (such as motion vectors) with the predetermined block size (for example, an 8×8-pixel block) or instructs the motion compensation unit 402 to make an interpretation of the motion parameters corresponding to this conversion. The motion compensation unit 206 includes an inside pixel interpolation unit (not illustrated) that interpolates pixel values of the sub-pixel locations such as a half pixel and a quarter pixel by using a linear filter and the like. The motion compensation unit 206 generates the predictive image data "Pred" that is motion compensation data from the decoded image data "Recon" in the picture memory 204 based on the coding mode "Mod" at the time of coding, motion parameters "MotionParam" and the like. At this time, when the current macroblock to be decoded is coded in the direct mode, motion vectors for generating the predictive image data "Pred" are not coded. Consequently, the motion compensation unit 402 calculates motion vectors in the current block to be motion-compensated using motion vectors converted by the motion information conversion unit 401 (converted, for example, to a block size that is an 8×8 block or larger) and motion vectors derived in blocks adjacent to the current block to be decoded, and generates the predictive image data "Pred" on a block-by-block basis, the block being the current block to be motion-compensated (for example, an 8×8-pixel block) with the size that is larger than the smallest block size of a P picture. The motion vector storage unit 205 stores the motion parameters "MotionParam" extracted by the variable length decoding unit 201. The addition unit 203 adds the predictive residual image data "Res" outputted from the image decoding unit 202 to the predictive image data "Pred" that is motion picture compensation data outputted from the motion compensation unit 206 and generates the decoded image data "Recon." The picture memory 204 stores the generated decoded image data "Recon."

Hereinafter, the picture coding apparatus 300 and the picture decoding apparatus 400 constructed as described above are explained.

In the present embodiment, in the direct mode of a B picture, the motion vector estimation unit 302 in the picture coding apparatus 300 and the motion compensation unit 402 in the picture decoding apparatus 400 select a motion vector used for motion-compensating the current block to be motion-compensated from among a plurality of vectors depending on motion vectors of the motion-compensated block in a subsequent picture which is co-located with the current block to be motion-compensated. For example, the motion vector compensation unit 302 or the motion compensation unit 402 selects as a motion vector of the current macroblock to be coded or decoded either the motion vector (0, 0) or the motion vector being calculated using motion vectors of adjacent blocks that have been already coded or decoded in the pictures to be coded or decoded, and determines that the selected motion vector to be the motion vector in the current block to be motion-compensated. The adjacent blocks are the blocks that have been already coded or decoded in the same current picture to be coded and are neighboring blocks to the current macroblock to be coded or decoded. Hereinafter, regarding the motion compensation method in the direct mode using motion vectors in the adjacent blocks that have been already determined and motion parameters in a backward reference picture, the processes in the picture coding apparatus 300 are explained first.

Figure 6A:
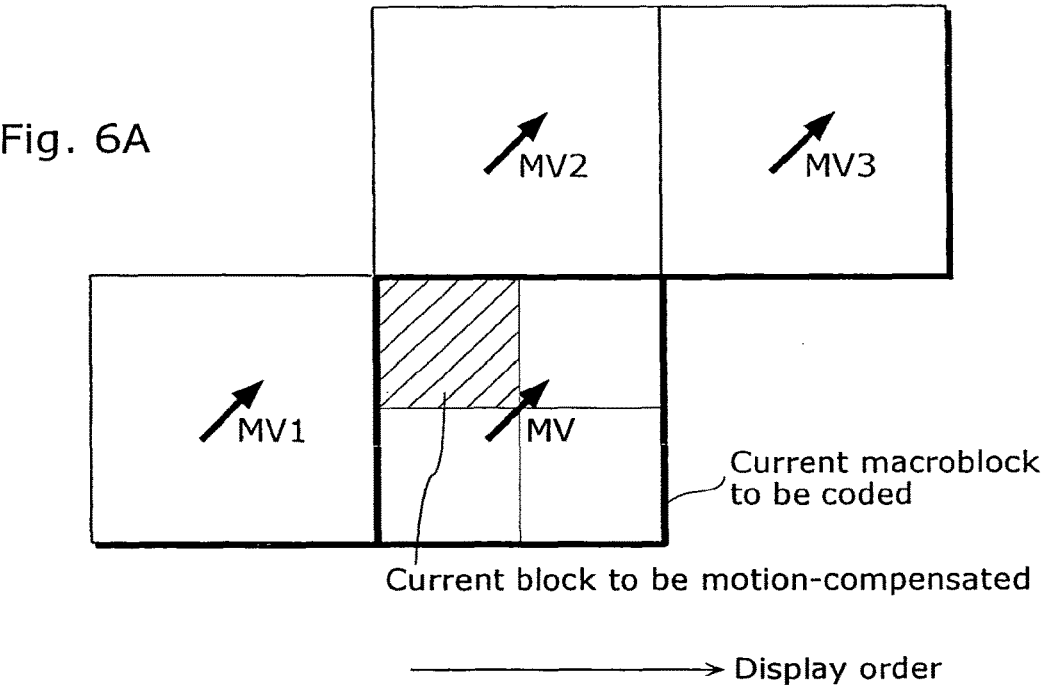
FIG. 6A is a diagram showing a method for determining the motion vector MV of the current macroblock to be coded or decoded using motion vectors in the adjacent blocks when the adjacent blocks are motion-compensated in the same block size as the current macroblock to be coded or decoded.
Figure 6B:
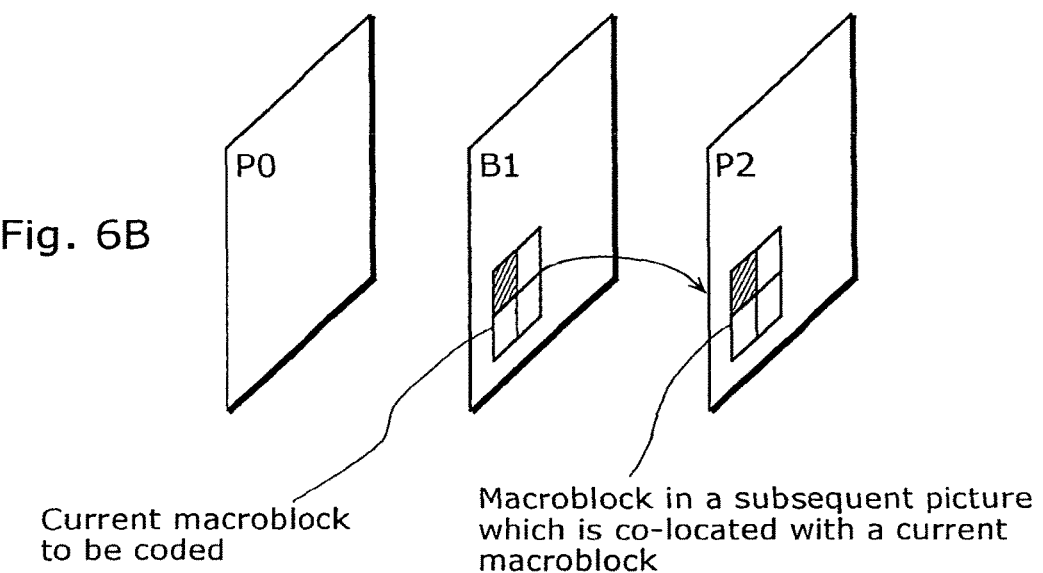
FIG. 6B is a diagram showing the correspondence between the current block to be motion-compensated and a block in a subsequent picture which is co-located with the current block when the current macroblock to be coded or decoded and the block in a subsequent picture which is co-located with a current block are motion-compensated in the same block size.
Figure 7:
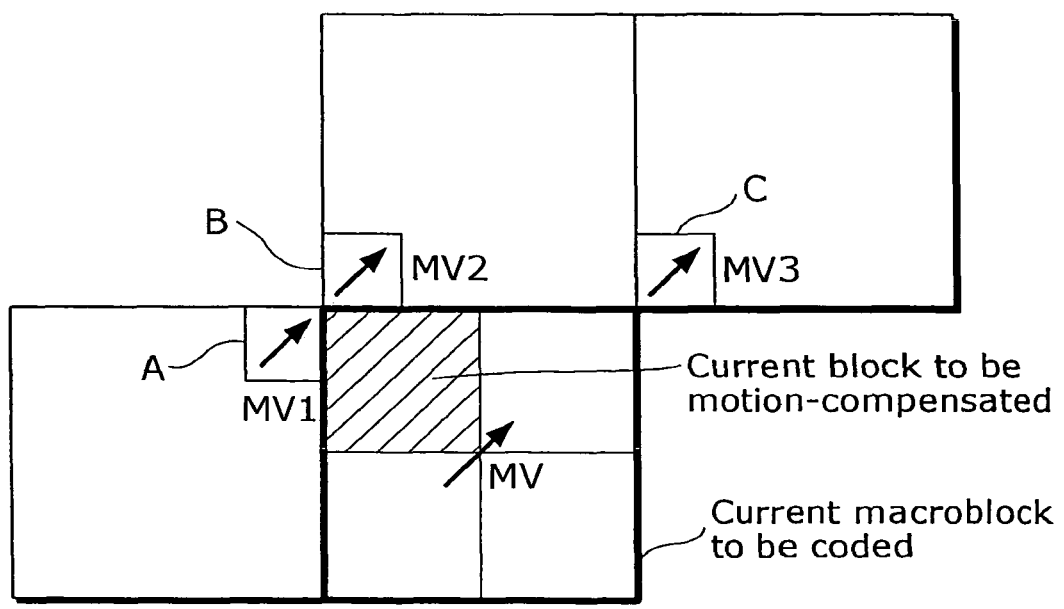
FIG. 7 is a diagram showing a method for determining the motion vector of the macroblock to be coded or decoded using motion vectors of adjacent blocks when the adjacent blocks are motion-compensated in a smaller block size than the current block to be coded or decoded.
Figure 8:
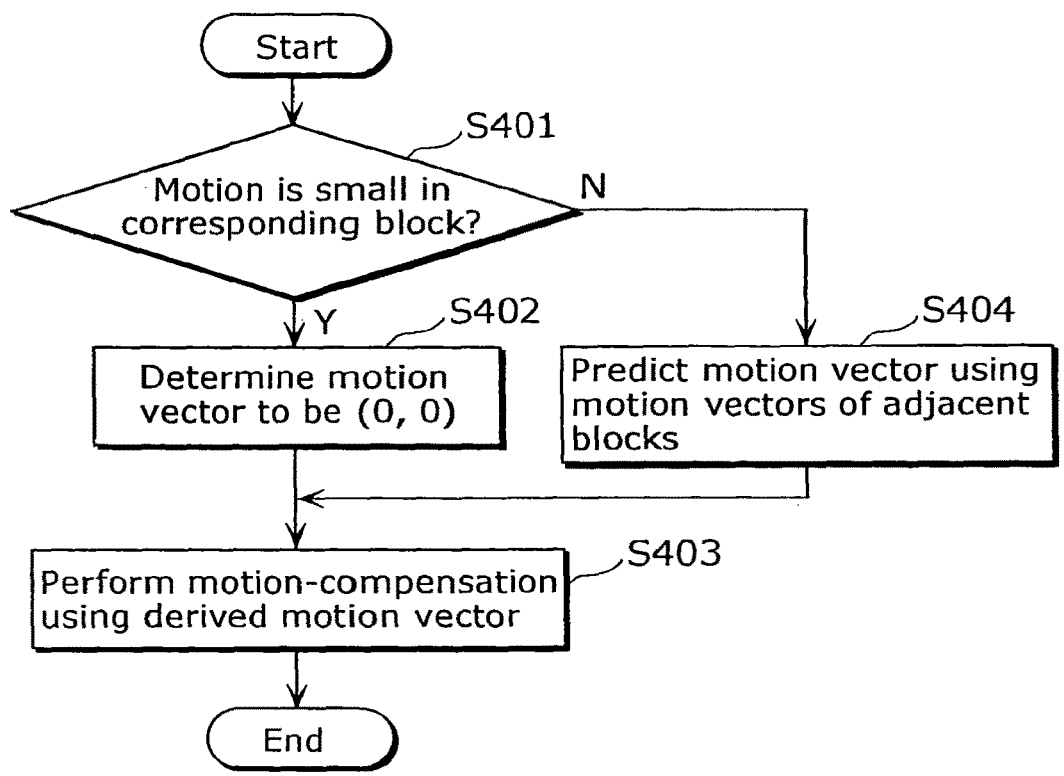
FIG. 8 is a flowchart showing a process for motion-compensating the current block to be motion-compensated with a different method (a different motion vector) depending on a motion of the block in a subsequent picture co-located with the current block to be motion-compensated when a current macroblock to be coded or decoded and a macroblock in a subsequent picture which is co-located with the current macroblock are motion-compensated with the same block size.

FIG. 6A is a diagram showing a method for determining the motion vector MV of the current macroblock to be coded or decoded using motion vectors in the adjacent blocks when the adjacent blocks are motion-compensated in the same 16×16-pixel block size as the current macroblock. FIG. 6B is a diagram showing the correspondence between the current block to be motion-compensated and the block in a subsequent picture which is co-located with a current block to be coded or decoded when the current macroblock and the block in a subsequent picture which is co-located with a current block are motion-compensated in the same block size. FIG. 7 is a diagram showing a method for determining the motion vector of the current macroblock using motion vectors of adjacent blocks when the adjacent blocks are motion-compensated in a smaller block size than the current block. FIG. 8 is a flowchart showing a process for motion-compensating the current block to be motion-compensated with a different method (a different motion vector) depending on a motion of the block in a subsequent picture co-located with the current block to be motion-compensated when a current macroblock to be coded or decoded and the macroblock in a subsequent picture which is co-located with the current macroblock are motion-compensated with the same block size.

First, a case where the current block to be motion-compensated in the current picture to be coded B1 and the block in a subsequent picture co-located with the current block to be motion-compensated in the backward P picture P2 are of the same size and have a one-to-one correspondence is explained. The motion information conversion unit 301 judges whether the size of motion compensation of the block in a subsequent picture which is co-located with the current block to be motion-compensated is the same as the size of the current block to be motion-compensated. When they are same, the motion information conversion unit 301 instructs the motion vector estimation unit 302 to calculate the motion vector of the current block to be motion-compensated following the procedure shown in the flowchart of FIG. 8. As is shown in the flowchart of FIG. 8, the motion vector estimation unit 302, first, judges whether "the motion is small" or not in the block co-located with the current block to be motion-compensated (the standard block) in the picture P2 that is a P picture (a standard picture) following the current picture to be coded B1 shown in FIG. 6B. In other words, a P picture displayed temporally later than the picture B1 and is neighboring to the picture B1 (S401), and when "the motion is small," the motion vector in the current block to be motion-compensated is determined to be (0, 0), step (S402). In other words, to this current block to be motion-compensated, the motion compensation using an interpicture prediction is performed determining that the motion vector is (0, 0). Here, "the motion is small" means that the block is coded referring to the nearest picture to the picture in which the block is included and the size (the absolute value) of the motion vector is within "1." But it is acceptable that "the motion is small" simply when the size of the motion vector is the predetermined value or less. Additionally, it is also acceptable that "the motion is small" when determining that the particular picture is the reference picture.

On the other hand, when "the motion is NOT small" in the block co-located with the current block to be motion-compensated in a backward P picture, in other words, either when the standard block is not coded referring to the nearest picture or when the size of the motion vector exceeds "1," the motion vector estimation unit 302 determines that the motion vector MV in the current macroblock to be coded that is calculated using motion vectors in the blocks adjacent to the current macroblock to be coded is the motion vector in the current block to be motion-compensated, step (S404). By the way, in an explanation below, both of Picture P0 and Picture P2 are determined to be the nearest pictures to Picture B1.

To calculate the motion vector MV of the current macroblock to be coded, the motion vector estimation unit 302, first, chooses three coded blocks (adjacent blocks) neighboring to the current macroblock to be coded. Since the standard and the method for the selection are not important here, their explanations are omitted. FIG. 6A shows the three selected blocks adjacent to the current macroblock to be coded. As is shown in FIG. 6A, in the macroblock located over the current macroblock to be coded, the motion vector MV2 has been already determined; in the macroblock located upper right to the current macroblock to be coded, the motion vector MV3 has been already determined. Moreover, in the macroblock located left to the current macroblock to be coded, the motion vector MV1 has been already determined. The motion vector estimation unit 302 determines the motion vector MV of the current macroblock to be coded using these motion vectors, MV1, MV2 and MV3. For example, the motion vector referring to the temporally nearest picture to the current picture to be coded from among the motion vectors, MV1, MV2 and MV3, is determined to be a candidate for the motion vector MV in the current macroblock to be coded. Here, "the temporally nearest picture to the current picture to be coded" means the forward and nearest picture to the current picture to be coded when predicting the motion vector in the current macroblock to be coded referring to a forward picture, and the backward and nearest picture to the current picture to be coded when predicting the motion vector of the current macroblock to be coded referring to a backward picture. At this time, the motion vector estimation unit 302 determines that:

(1) the motion vector MV of the current macroblock to be coded is (0, 0) when there is no motion vector referring to the temporally nearest picture to the current picture to be coded;

(2) the candidate is the motion vector MV in the macroblock when there is one motion vector referring to the temporally nearest picture to the current picture to be coded; and (3) the median of the three motion vectors in the adjacent blocks is the motion vector MV of the current macroblock to be coded when there are two or more motion vectors determining that the motion vector in the adjacent block that does not refer to the nearest picture is (0, 0).

Up to now, the case that the adjacent blocks to the current macroblock to be coded is motion-compensated in the same size as the current block to be coded is explained using FIG. 6A. As is shown in FIG. 7, however, even when the adjacent blocks are motion-compensated in a different block size from and a smaller block size than that of the current macroblock to be coded, it is also possible to similarly calculate the motion vector MV in the current macroblock to be coded. In FIG. 7, the case that motion vectors are estimated with a 4×4-pixel block as the unit in the adjacent blocks toward a 16×16-pixel current macroblock to be coded is explained. In a case like this, to calculate the motion vector MV of the current macroblock to be coded, the motion vector estimation unit 302, first, selects the three adjacent blocks (the block A, the block B and the block C).

The Block A, for example, belongs to the macroblock located left to the current macroblock to be coded and touches the upper left corner of the current macroblock to be coded. Furthermore, the block B, for example, belongs to the macroblock located over the current macroblock to be coded and touches the upper left corner of the current macroblock to be coded. Further, the block C, for example, belongs to the macroblock located upper right to the current macroblock to be coded and touches the upper right corner of the current macroblock to be coded.

For the blocks A, B and C, the motion vectors MV1, MV2 and MV3 have been already determined, respectively. The motion vector estimation unit 302 applies the above-mentioned determinations (1), (2) and (3) to the motion vectors, MV1, MV2 and MV3 and can determine the motion vector MV in the current macroblock to be coded similar to the case that the current macroblock to be coded and the adjacent blocks are motion-compensated in the same size. Regarding each current block to be motion-compensated in the current macroblock to be coded, as already explained, depending on whether "the motion is small" or not in the block in a subsequent picture which is co-located with a current block, the motion vector estimation unit 302 selects either the motion compensation using the motion vector (0, 0) or the motion compensation using the motion vector MV.

As is described above, when the motion vector of the current block to be motion-compensated is determined, the motion compensation unit 303 generates the predictive image data "Pred" from the reference picture data "Ref" in the picture memory 106 using the determined motion vector, step (S403).

Up to now, the case that the block in a subsequent picture which is co-located with the current block to be motion-compensated is motion-compensated in the same block size with the current block to be motion-compensated is explained. Hereinafter, the case that the block in a subsequent picture which is co-located with the current block to be motion-compensated is motion-compensated in a different block size from that of the current block to be compensated is explained. In the picture coding apparatus 300, when performing the bi-predictive motion compensation of a B picture, the motion compensation unit 303 and the motion vector estimation unit 302 perform motion compensation targeting at blocks with a predetermined size (for example, 8×8-pixel blocks) that is larger than the smallest (4×4-pixel) block that can be a target block for unidirectional predictive motion compensation. Consequently, when a backward reference picture of a picture that is motion-compensated bi-predictively is motion-compensated unidirectionally, the case that the block in a subsequent picture which is co-located with the current block to be motion-compensated is motion-compensated in a smaller block size than that of the current block to be motion-compensated may occur.

Figure 9:
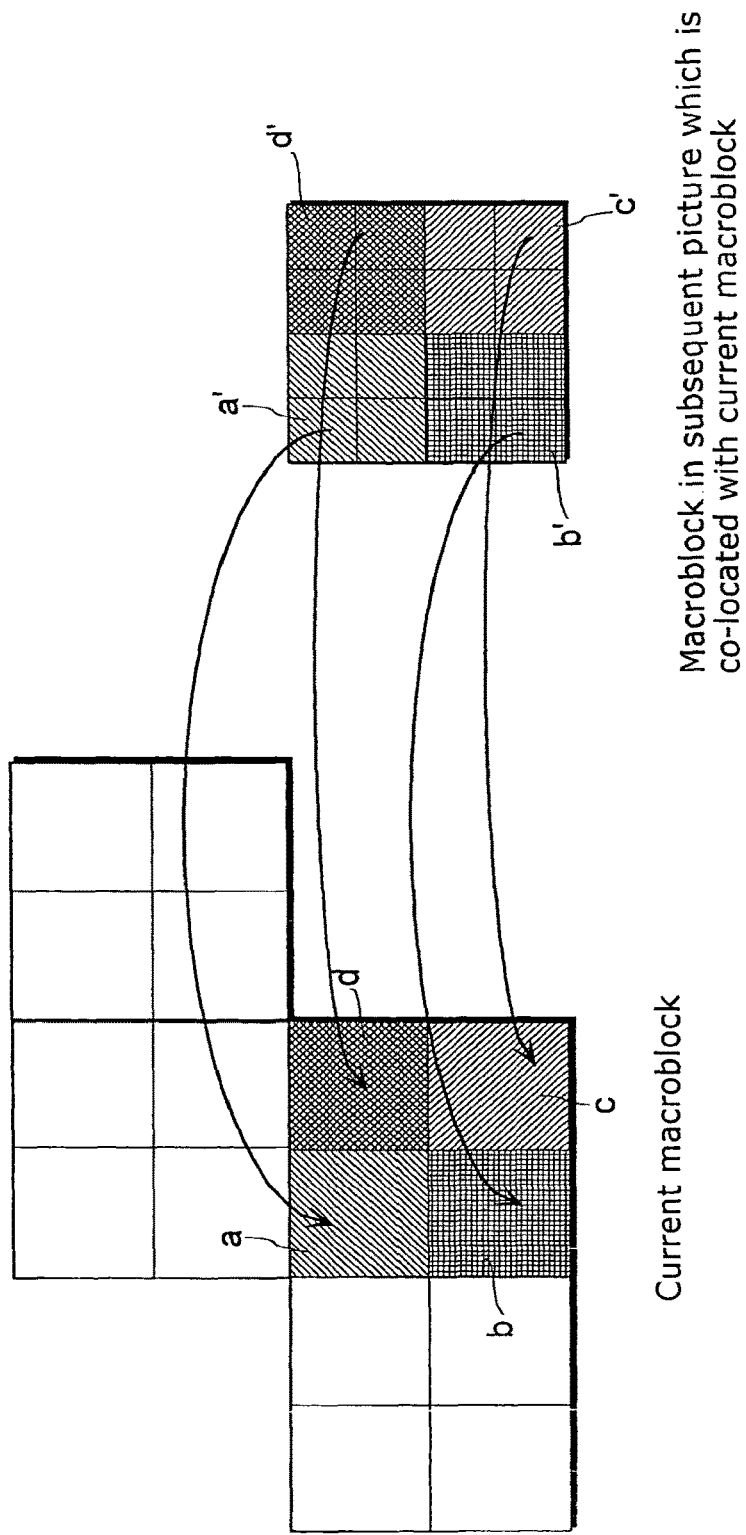
FIG. 9 is a diagram showing the correspondence between the current block to be motion-compensated and the plurality of blocks in a subsequent picture which is co-located with the current block to be motion-compensated when a current macroblock to be coded or decoded and the macroblock in a subsequent picture which is co-located with the current macroblock are motion-compensated in different block sizes.

FIG. 9 is a diagram showing the correspondence between the current block to be motion-compensated and the plurality of blocks in a subsequent picture which is co-located with the current block to be motion-compensated when a current macroblock to be coded or decoded and the macroblock in a subsequent picture which is co-located with the current macroblock are motion-compensated in different block sizes. In the left side of FIG. 9 is shown a current macroblock to be coded in the current B picture to be coded; in the right side of FIG. 9 is shown the macroblock in the subsequent picture which is co-located with the current macroblock to be coded in the nearest backward picture (a P picture or a B picture) to the current B picture. The size of the macroblocks is the same and 16 pixels×16 pixels, for example. The macroblock in a subsequent picture shown in the right side of FIG. 9, which is co-located with a current macroblock is coded earlier than a current picture and is assumed to be already motion-compensated with a 4×4-pixel block (the smallest lot in the figure), for example, as the unit.

Figure 10:
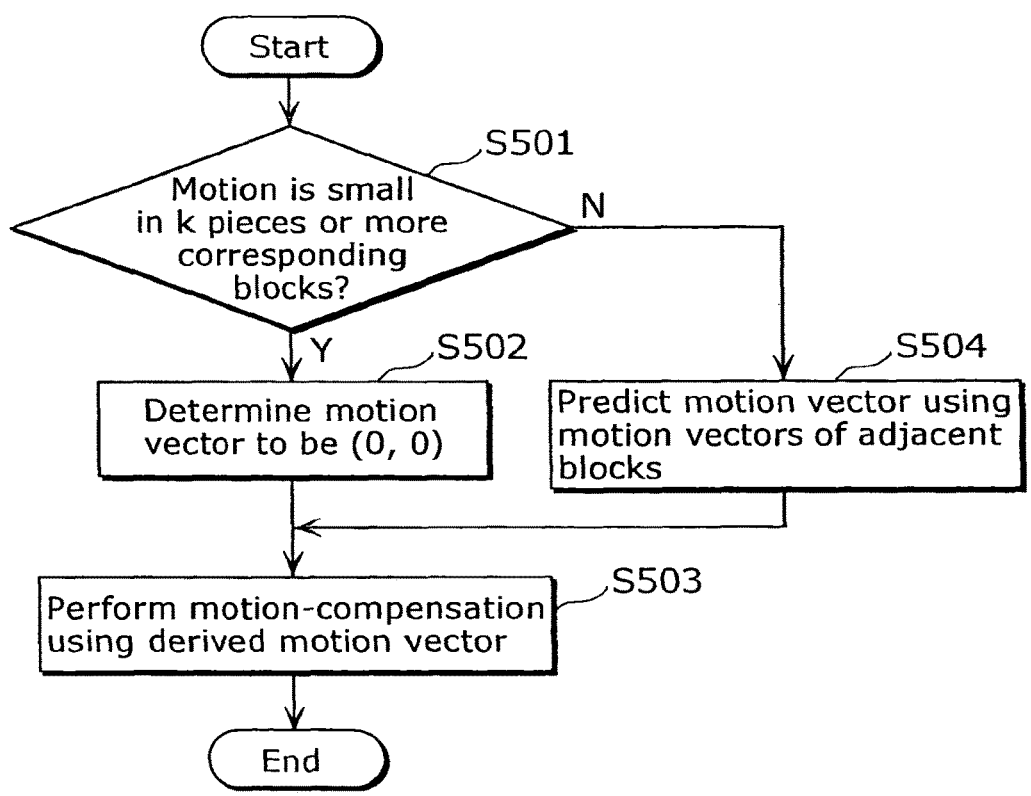
FIG. 10 is a flowchart showing a process for motion-compensating the current block to be motion-compensated with a different method (a different motion vector) depending on a motion of the block in a subsequent picture co-located with the current block to be motion-compensated when a current macroblock to be coded or decoded and the macroblock in a subsequent picture which is co-located with the current macroblock are motion-compensated with different block sizes.

FIG. 10 is a flowchart showing a process for motion-compensating the current block to be motion-compensated with a different method (a different motion vector) depending on a motion of the block in a subsequent picture co-located with the current block to be motion-compensated when a current macroblock to be coded or decoded and the macroblock in a subsequent picture which is co-located with the current macroblock are motion-compensated with different block sizes. The motion information conversion unit 301, first, judges whether the block in a subsequent picture which is co-located with the current block to be motion-compensated and the current block to be motion-compensated are motion-compensated in the same block size or not. When they are not motion-compensated in the same block size, the motion information conversion unit 301 instructs the motion vector estimation unit 302 to calculate the motion vector in the current block to be motion-compensated following the procedure shown in the flowchart of FIG. 10. Here, since the size of the current block to be motion-compensated is 8 pixels×8 pixels and the block in a subsequent picture which is co-located with the current block to motion-compensated with a 4×4-pixel size. The motion vector estimation unit 302 calculates the motion vector in the current block to be motion-compensated following the flowchart shown in FIG. 10.

In the flowchart shown in FIG. 10, the process in Step S501 is different from the process in Step S401 shown in the flowchart in FIG. 8. As is shown in FIG. 9, in the motion compensation method according to the present invention, one current block to be coded is motion-compensated in each unit of four current blocks to be motion-compensated. Assume them to be, for example, the current block to be motion-compensated a, the current block to be motion-compensated, block b, the current block to be motion-compensated c and the current block to be motion-compensated d. To these current blocks to be motion-compensated, in the macroblock in a subsequent picture which is co-located with a current macroblock, the block a', the block b', the block c' and the block d' correspond, respectively. Each of these blocks a', b', c' and d' is further composed of four 4×4-pixel current blocks to be motion-compensated. The motion vector estimation unit 302, first, identifies the block a' in the macroblock in a subsequent picture which is co-located with and corresponds to the current block a to be motion-compensated in the current macroblock to be coded and judges whether "the motion is small" or not in two or more current blocks to be motion-compensated out of the four current blocks to be motion-compensated that compose the block a' (S501).

The standard for judging whether "the motion is small" or not in the current blocks to be motion-compensated is similar to that of Step S401 in the flowchart shown in FIG. 8. When "the motion is small" in two or more current blocks to be motion-compensated, the motion vector estimation unit 302 determines that the motion vector of the current block to be motion-compensated in the current macroblock to be coded is (0, 0), step (S502); the motion compensation unit 303 performs motion compensation using the determined motion vector (0, 0), step (S502). When "the motion is NOT small" in two or more blocks, in other words, when the number of the current blocks to be motion-compensated whose "motion is small" is less than two, the motion vector estimation unit 302 determines the motion vector MV of the current macroblock to be coded using motion vectors of adjacent blocks to the current macroblock to be coded, step (S504). The process for determining the motion vector MV of the current macroblock to be coded using the motion vectors of the adjacent blocks is similar to that of Step S404 in FIG. 8. The motion compensation unit 303 generates the motion compensation predictive pixel values of the current block to be motion-compensated a using the motion vector MV determined like this, step (S503).

The motion compensation unit 303, the motion vector estimation unit 302 and the motion information conversion unit 301 repeat the processes of the above-mentioned Steps S501~S504 to the remaining current blocks to be motion-compensated, blocks b, c and d, and complete the motion compensation to the current macroblock to be coded when performing the motion compensation to all the current blocks to be motion-compensated, a, b, c and d.

On the other hand, the picture decoding apparatus 400 decodes the coded data "Bitstream" coded by the picture coding apparatus 300. In the direct mode, the picture decoding apparatus 400 can motion-compensate each current block to be motion-compensated similarly to the picture coding apparatus 300 because the motion information conversion unit 401 performs the process corresponding to that of the motion information conversion unit 301 in the picture coding apparatus 300 and the motion compensation unit 402 performs the processes corresponding to those of the motion vector estimation unit 302 and the motion compensation unit 300 in the picture coding apparatus 300.

Additionally, when it is indicated in the coding mode "Mod" extracted from the coded data "Bitstream" by the variable length decoding unit 201 that current macroblocks to be decoded is coded in the direct mode, the motion information conversion unit 401 judges whether the size of the motion-compensated block in a subsequent picture which is co-located with a current block to be motion-compensated is the same as the size of the current block to be motion-compensated; when they are same, the motion information conversion unit 401 instructs the motion vector estimation unit 402 to calculate the motion vector of the current block to be motion-compensated following the procedure shown in the flowchart of FIG. 8.

Following this instruction, the motion vector estimation unit 402, first, judges whether "the motion is small" or not in the motion-compensated block in a P picture (a backward reference picture) P2 which is co-located with the current block to be motion-compensated following the current picture to be decoded B1 shown in FIG. 6B, step (S401), and when "the motion is small", the motion vector in the current block to be motion-compensated is determined to be (0, 0), step (S402). In other words, to this current block to be motion-compensated, the motion compensation using an inter picture prediction is not performed. On the other hand, when "the motion is NOT small" in the motion-compensated block in a backward P picture which is co-located with the current block to be motion-compensated, the motion vector estimation unit 402 determines that the motion vector MV of the current macroblock to be decoded that is calculated using motion vectors of the blocks adjacent to the current macroblock to be decoded is the motion vector of said current block to be motion-compensated (S404). The method for calculating the motion vector of the current macroblock to be decoded using the motion vectors in the decoded adjacent blocks is the same as the method explained in the case of the picture coding apparatus 300.

When the motion vector of the current block to be motion-compensated is determined in Step S402 or Step S404, the motion compensation unit 402 reads out the block whose location is shown by the determined motion vector out of the reference picture data "Ref" in the picture memory 204 and generates the predictive image data "Pred," step (S403). As is described above, although the current block to be motion-compensated and the motion-compensated block in a subsequent picture which is co-located with the current block to be motion-compensated are motion-compensated in the same block size, the motion compensation unit 402 can determine the motion vector for each current block to be motion-compensated and perform motion compensation, depending on whether "the motion is small" or not in the current block to be motion-compensated in a subsequent picture which is co-located with a current block.

Additionally, when it is indicated that the current macroblock to be decoded is coded in the direct mode in the extracted coding mode "Mod" and when the current block to be motion-compensated and the motion-compensated block in a subsequent picture which is co-located with the current block to be motion-compensated are not motion-compensated in the same block size, the motion information conversion unit 401 instructs the motion compensation unit 402 to calculate the motion vector of the current block to be motion-compensated following the procedure shown in the flowchart of FIG. 10. In the macroblock (in a subsequent P picture) which is co-located with the current macroblock to be decoded (in the current picture to be decoded and to which the subsequent P picture is nearest), the motion compensation unit 402 examines the motion of four 4×4-pixel motion-compensated blocks included in an 8×8-pixel block corresponding to a current 8×8-pixel block to be motion-compensated and determines the motion vector of the current block to be motion-compensated to be (0, 0) when "the motion is small" in two or more motion-compensated blocks out of the four, step (S502). When it is not the case, the motion compensation unit 402 determines the motion vector MV of the current macroblock to be decoded, which is calculated using the motion vectors of adjacent blocks to the current macroblock to be decoded, to be the motion vector of the current block to be motion-compensated, step (S504). When the motion vector of the current block to be motion-compensated is determined in Step S502 or Step S504, the motion compensation unit 402 reads out the block whose location is shown by the determined motion vector of the reference picture data "Ref" in the picture memory 204 and generates the predictive image data "Pred." Hereby, although the current block to be motion-compensated and the motion-compensated block in a subsequent picture which is co-located with the current block to be motion-compensated are motion-compensated in different block sizes, the motion compensation unit 402 can judge whether "the motion is small" or not in the motion-compensated block in a subsequent picture which is co-located with a current block. Consequently, the motion compensation unit 402 can, depending on this judgment result, determine the motion vector of each current block to be motion-compensated and perform motion compensation to the current block to be motion-compensated.

As described above, since the picture coding apparatus 300 and the picture decoding apparatus 400, using the motion compensation method according to the present invention, perform motion compensation with a larger-sized current block to be motion-compensated than the conventional current block to be motion-compensated as the unit, in motion-compensation coding a B picture, the load by access to the picture memory in coding and decoding the B picture can be reduced.

By the way, in the above-described First Embodiment, the size of a current block to be motion-compensated of a B picture is explained to be 8 pixels×8 pixels and the size of a motion-compensated block of a P picture is explained to be 4 pixels×4 pixels but the present invention is not limited to these sizes and it is acceptable to decide on different sizes from these sizes. Moreover, when "the motion is small" in two or more motion-compensated blocks of the blocks corresponding to the current blocks to be motion-compensated in the nearest subsequent picture to a current picture, the motion vector of the current block to be motion-compensated is determined to be (0, 0), but it is not necessarily "two or more" and it is satisfactory to be "one or more" or "three or more" or "all." Furthermore, when current blocks to be motion-compensated and their sizes are decided to be other than the above-described, it is acceptable to decide appropriately according to the proportion of these block sizes. This is also applicable to the following embodiments.

Further, in the First Embodiment, in the flowchart shown in FIG. 8 or FIG. 10, the motion vector determined based on motion vectors of adjacent blocks is one for one current macroblock to be coded or decoded. Consequently, when the process of Step S404 or Step S504 is performed to the current block to be motion-compensated in the same current macroblock, the same calculation process is repeated every time as a result. However, the present invention is not limited to this. It is satisfactory, for example, to determine the motion vector in advance based on motion vectors of adjacent blocks for each current macroblock, in other words, to perform the process of Step S404 or Step S504 before the judgment in Step S401 or Step S501 and to simply "use the value of the motion vector determined in advance based on the motion vectors of the adjacent block as the motion vector of the current block to be motion-compensated" in Step S404 or Step S504. Hereby, when "the motion is NOT small" in the block in a subsequent picture which is co-located with the current block to be motion-compensated, the effect is to lessen the number of calculations of the motion vector based on the motion vectors of the adjacent blocks and to reduce the processing load of the motion vector estimation unit 302, and the motion compensation unit 402 is achieved. This is also applicable to the following embodiments.

Furthermore, instead of performing the process of Step S401 or Step S501 before the judgment of Step S401 or Step S501, it is acceptable to hold, in a memory and the like, the motion vector MV of the current macroblock to be code/decoded that is calculated by the process of Step S404 or Step 504 when the process of Step S404 or Step S504 is performed. The duration for holding the motion vector MV is the duration for processing current blocks to be motion-compensated in the same current macroblock. Specifically, it is satisfactory that the motion vector estimation unit 303 or the motion compensation unit 402 calculates the motion vector of the current macroblock only when "the motion is NOT small" in the block in a subsequent picture which is co-located with the current block to be motion-compensated in the current macroblocks and holds the motion vector MV of the current macroblock while the current blocks to be motion-compensated in the same current macroblock to be coded or decoded. Hereby, the effect to further lessen the number of calculations by the motion vector estimation unit 302 and the motion compensation unit 402 and to further reduce the processing load of the motion vector estimation unit 302 and the motion compensation unit 402 is achieved.

Additionally, in the First Embodiment, it is described that in Step S404 or Step S504 in the flowchart of FIG. 8 or FIG. 10, the motion vector of the current macroblock to be coded or decoded is determined using motion vectors of adjacent blocks, but it is not necessary to determine the motion vector MV of the current block to be coded or decoded by this method. For example, it is acceptable that the motion vector of the current macroblock is determined using the motion vector of the block in a picture which is co-located with the current macroblock in another picture whose motion vector has been determined in advance. This is also applicable to the following embodiments.

In addition, in the First Embodiment, it is explained that the motion information conversion unit 301 converts a motion parameter of a reference picture into a parameter with a predetermined block size after the motion parameter of the reference picture is stored in the motion vector storage unit 110 but it is satisfactory that the motion information conversion unit 301 performs the conversion before the motion parameter of the reference picture is stored in the motion vector storage unit 110. This is also applicable to the following embodiments. For example, when a motion parameter of a reference picture is estimated with a 4×4-pixel block as the unit for motion compensation, the motion information conversion unit 301 rewrites all the values of the motion vectors, MV1, MV2, MV3 and MV4 estimated in four 4×4-pixel blocks contained in the 8×8-pixel block into the value of one 4×4-pixel block, MV1, in the 8×8-pixel block, located in the four corners of the 16×16-pixel macroblock. Hereby, all the four 4×4-pixel blocks obtained by dividing the macroblock into four 8×8-pixel blocks and further dividing each 8×8-pixel block into four, have the same motion vectors as the motion vectors estimated for four 4×4-pixel blocks, in the 8×8-pixel block, located in the four corners of the macroblock. By storing a motion parameter converted like this in the motion vector storage unit 110, when the motion vector estimation unit 302 reads out the motion vector of any one of the four 4×4-pixel blocks included in the block in a subsequent picture which is co-located with the current block, the motion vector estimation unit 302 can easily judge the motion of the block in a subsequent picture which is co-located with a current block.

Additionally, it is acceptable that when the motion parameter of a reference picture is estimated with a 4×4-pixel block as the unit of motion compensation, for example, the motion information conversion unit 301 associates one motion vector, for example, MV1, with each 8×8-pixel block obtained by dividing a 16×16 macroblock into four, and stores the one motion vector in the motion vector storage unit 110. This is also applicable to the following embodiments. This motion vector is the motion vector and the like estimated for the four 4×4-pixel blocks, in the 8×8-pixel block, located in the four corners of the 16×16-pixel macroblock. Hereby, although the motion parameter of the reference picture is estimated with a 4×4-pixel block as the unit of motion compensation, the motion vector estimation unit 302 can judge whether "the motion is small" or not in the block in a subsequent picture which is co-located with a current block with a similar process to the process shown in FIGS. 6A and 8.

Further, it is satisfactory that when the motion parameter of a reference picture is estimated with a 4×4-pixel block as the unit of motion compensation, for example, the motion information conversion 301 judges whether "the motion is small" or not in the four 4×4-pixel blocks, in the 8×8-pixel block, located in the four corners of the 16×16-pixel macroblock and stores the flag indicating the judgment result associated with each 8×8-pixel block in the current macroblock to be coded in the motion vector storage unit 110. This is also applicable to the following embodiments. Hereby, it is not necessary for the motion vector estimation unit 302 to judge whether "the motion is small" or not in the block in a subsequent picture which is co-located with a current block when motion-compensating a B picture, and the effect to reduce processing load for motion-compensating a B picture is achieved.

The Second Embodiment

In the Second Embodiment that is explained next, when the current macroblock to be coded or decoded and the macroblock in a subsequent picture which is co-located with the current macroblock are motion-compensated in different sizes, the judgment method for selecting either determining the motion vector of the current block to be motion-compensated to be (0, 0) or determining the motion vector of the current block to be motion-compensated using the motion vectors of the adjacent blocks, is different from the judgment method of the First Embodiment. When the current macroblock and the macroblock in a subsequent picture which is co-located with the current macroblock are motion-compensated in the same block size, motion compensation of a current block to be motion-compensated is performed using the methods explained in FIGS. 6A, 6B, 7 and 8 of the First Embodiment. Consequently, in respect to the structure, the principally different parts between the picture coding apparatus/the picture decoding apparatus according to the Second Embodiment and the picture coding apparatus 300/the picture decoding apparatus 400 indicated in the First Embodiment, are the motion information conversion unit and the motion vector estimation unit in the picture coding apparatus, and the motion information conversion unit and the motion compensation unit in the picture decoding apparatus. The explanations of overlapping components are omitted below.

Figure 11:
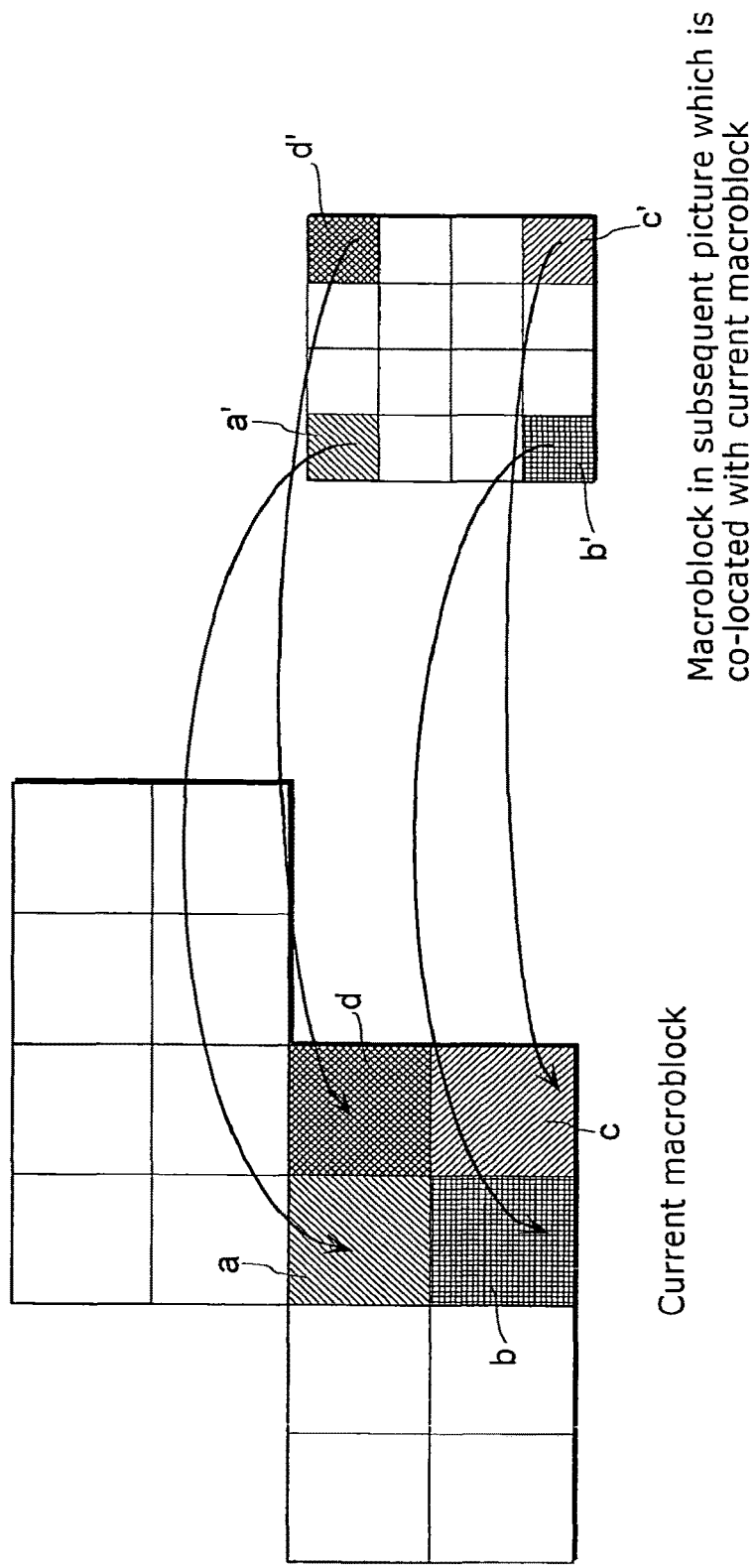
FIG. 11 is a diagram showing the correspondence between the current block to be motion-compensated and the plurality of blocks in a subsequent picture which are co-located with the current macroblock to be motion-compensated when the current macroblock to be coded or decoded and the macroblock in a subsequent picture which is co-located with a current block are motion-compensated in different block sizes in another embodiment.

FIG. 11 is a diagram showing the correspondence between the current block to be motion-compensated and the plurality of blocks in a subsequent picture which are co-located with the current block to be motion-compensated when the current macroblock to be coded/decoded and the macroblock in a subsequent picture which is co-located with a current macroblock are motion-compensated in different block sizes in the Second Embodiment. In the left side of FIG. 11 is shown a current macroblock to be coded or decoded in the current B picture to be coded or decoded, similarly to FIG. 9. In the right side of FIG. 11 is shown the macroblock in a subsequent picture which is co-located with the current macroblock, similarly to FIG. 9. The picture to which the macroblock, shown in the right side of FIG. 11, in a subsequent picture which is co-located with a current macroblock belongs is a P picture or a B picture; for example, motion vector estimation and motion compensation have been already performed to the macroblock with a 4×4-pixel block (the smallest lot in FIG. 11) as the unit. To the current macroblock shown in the left side of FIG. 11, similarly to FIG. 9, motion vector determination and motion compensation is performed with an 8×8-pixel block as the unit.

As is shown in FIG. 11, one current macroblock to be coded or decoded is composed of four current blocks to be motion-compensated. When the four current blocks to be motion-compensated are called, for example, to be the current blocks to be motion-compensated a, b, c and d, in the macroblock in a subsequent picture which are co-located with a current block, four 8×8-pixel blocks, each of which is composed of four motion-compensated 4×4-pixel blocks, correspond to each the current block to be motion-compensated.

Figure 12:
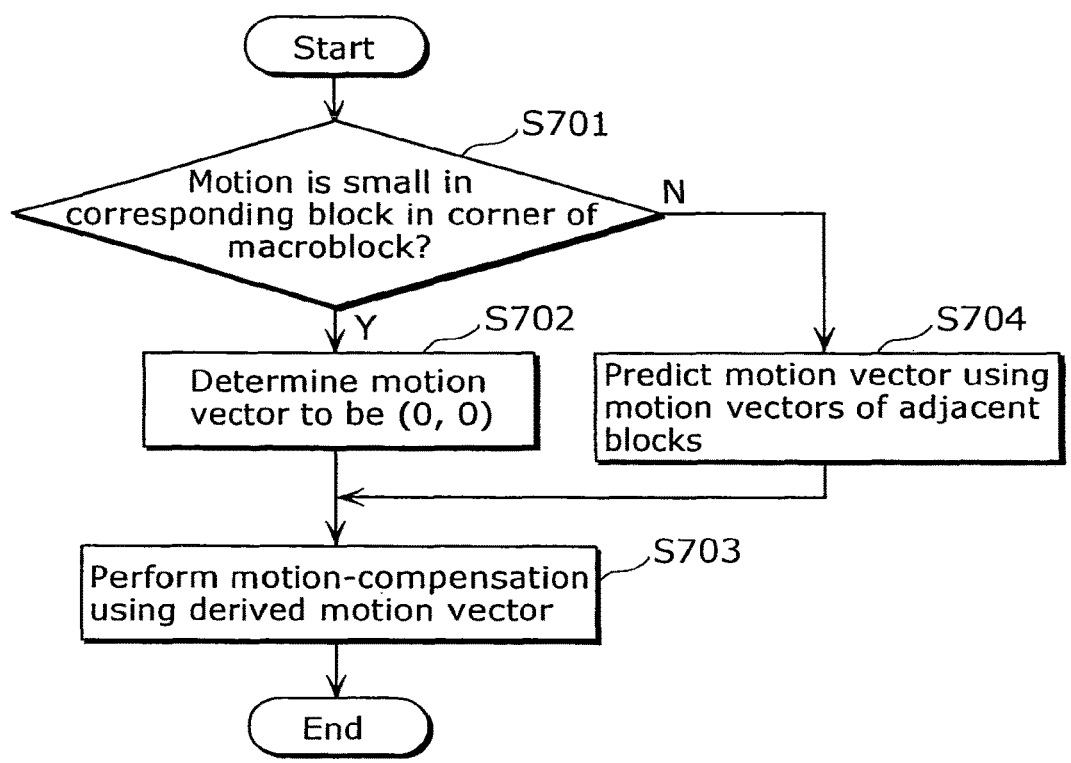
FIG. 12 is a flowchart showing a process in the another embodiment for motion-compensating the current block to be motion-compensated with a different method (a different motion vector) depending on a motion of the block in a subsequent picture co-located with the current block to be motion-compensated when the current macroblock to be coded or decoded and the macroblock in a subsequent picture which is co-located with the current macroblock are motion-compensated with different block sizes.

FIG. 12 is a flowchart showing a process in the Second Embodiment for motion-compensating the current block to be motion-compensated with a different method (a different motion vector) depending on a motion of the block in a subsequent picture co-located with the current block to be motion-compensated when a current macroblock to be coded or decoded and a macroblock in a subsequent picture which is co-located with the current macroblock are motion-compensated with different block sizes. As already explained, in the motion compensation method according to the Second Embodiment, since only the judgment method for selecting the motion vector of the current block to be motion-compensated is different, only the process in Step S701 of FIG. 12 is different from the process in Step S501 of FIG. 10.

First, the motion information conversion unit judges whether the size of motion compensation in the block in a subsequent picture which is co-located with the current block to be motion-compensated is the same as the size of the current block to be motion-compensated or not. When they are same, the motion information conversion unit instructs the motion vector estimation unit to calculate the motion vector of the current block to be motion-compensated following the procedure shown in the flowchart of FIG. 8. On the contrary, when the motion compensation is not performed in the same block size, the motion information conversion unit instructs the motion vector estimation unit or the motion estimation unit to calculate the motion vector of the current block to be motion-compensated.

The motion vector estimation unit or the motion compensation unit judges whether "the motion is small" or not in the motion-compensated block a' located in a corner of the macroblock in a subsequent picture which is co-located with a current block out of the four motion-compensated blocks that compose the block in the macroblock in a subsequent picture which is co-located with a current macroblock, the block a' corresponding to the motion-compensated block a in the current macroblock, step (S701).

The standard for judging whether "the motion is small" or not in the motion-compensated block a' is similar to that in Step S401 shown in FIG. 8. When "the motion is small" in the motion-compensated block a', the motion vector estimation unit or the motion vector compensation unit determines that the motion vector of the current block to be motion-compensated in the current macroblock to be coded or decoded is (0, 0), step (S702). The motion compensation unit motion-compensates the current block to be motion-compensated a using the determined motion vector (0, 0), step (S703).

When "the motion is NOT small" in the current block to be motion-compensated a', using the motion vectors of the adjacent blocks to the current block to be coded or decoded, the motion vector estimation unit or the motion compensation unit determines the motion vector MV of the current macroblock, step (S704). The process for determining the motion vector MV of the current macroblock using the motion vectors of the adjacent blocks is similar to the process in Step S404 of FIG. 8. The motion compensation unit generates the motion compensation predictive pixel values of the current block to be motion-compensated a using the motion vector MV determined like this, step (S703). By the process described above, the motion compensation of one current block to be motion-compensated has been completed.

The motion vector estimation unit, the motion compensation unit and the motion information conversion unit in the picture coding apparatus according to the Second Embodiment and the motion compensation unit and the motion information conversion unit in the picture decoding apparatus according to the Second Embodiment subsequently repeats the process of the above-mentioned Steps S701~S704 to the remaining current blocks to be motion-compensated, blocks b, c and d and complete motion compensation to one current macroblock to be coded or decoded.

In other words, regarding the current block to be motion-compensated, block b, the motion vector estimation unit judges whether "the motion is small" or not in the motion-compensated block b', in the block in a subsequent picture which is co-located with the current block to be motion-compensated, block b, located in a corner of the macroblock in a subsequent picture which is co-located with the current macroblock, and selects the motion vector (0, 0) when "the motion is small" in the motion-compensated block b'. When "the motion is NOT small" in the motion-compensated block b', the motion vector estimation unit selects the motion vector MV of the current macroblock using the motion vectors of the adjacent blocks. The motion compensation unit performs motion compensation to the current block to be motion-compensated, block b, using the selected motion vector.

Additionally, similar to the current blocks to be motion-compensated, blocks c and d, the motion vector estimation unit selects the motion vector depending on the motion of the motion-compensated blocks c and d, and the motion compensation unit motion-compensates the current blocks to be motion-compensated, blocks c and d. Herewith, when the picture coding apparatus and the picture decoding apparatus perform motion compensation to all the current blocks to be motion-compensated in the current macroblock, the picture coding apparatus and the picture decoding apparatus complete motion compensation to the current macroblock to be coded or decoded.

As is described above, by the motion compensation method according to the Second Embodiment, since it is possible to select the motion vector used for motion-compensating the current block to be motion-compensated only by examining the motion of one motion-compensated block located in a corner of the macroblock in a subsequent picture which is co-located with a current macroblock, the effect to reduce the processing load of the motion vector estimation unit or motion compensation unit compared with the motion compensation method according to the First Embodiment is achieved.

The Third Embodiment

Furthermore, it is possible to easily perform the processing shown in the above embodiments in an independent computing system by recording a program for realizing the picture coding method and the picture decoding method shown in the above-mentioned embodiments onto a storage medium such as a flexible disk.

Figure 13A:
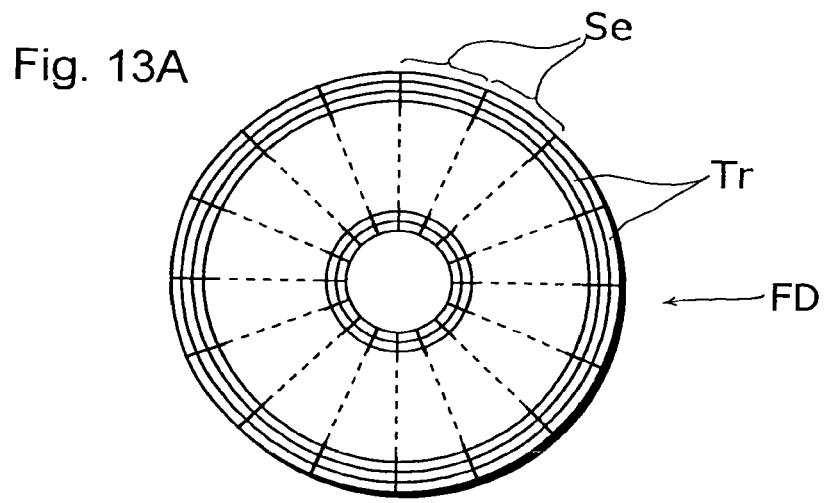
FIG. 13A shows an example of a physical format of the flexible disk as a main body of a storing medium.
Figure 13B:
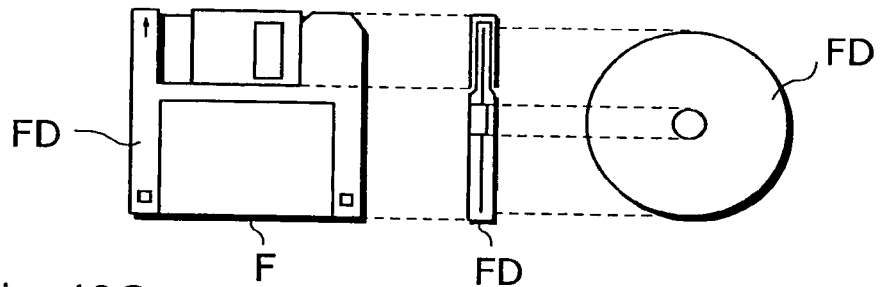
FIG. 13B shows a full appearance of a flexible disk, its structure at cross section and the flexible disk itself.
Figure 13C:
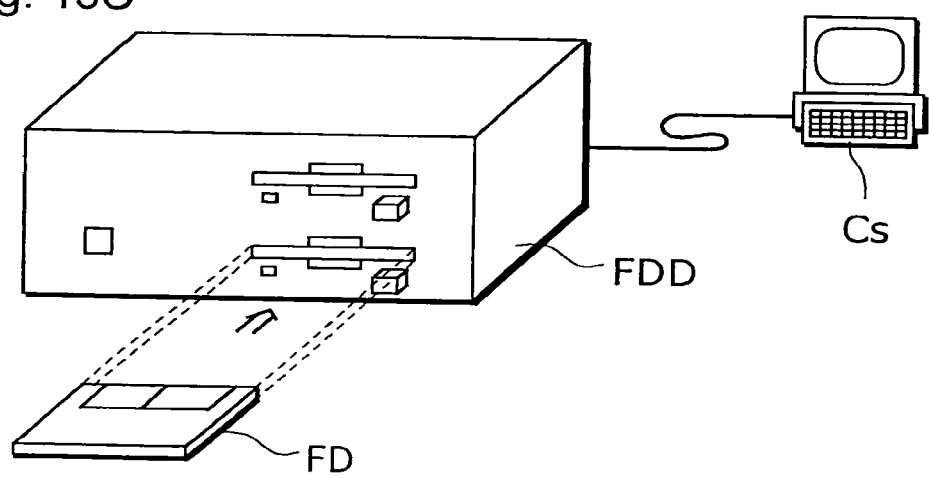
FIG. 13C shows a structure for recording and reading out the program on the flexible disk FD.

FIG. 13 is an illustration of a recoding medium for storing a program for realizing the First and Second Embodiments by a computer system.

FIG. 13B shows a full appearance of a flexible disk, its structure at cross section and the flexible disk itself; whereas FIG. 13A shows an example of a physical format of the flexible disk as a main body of a storing medium. A flexible disk FD is contained in a case F, a plurality of tracks Tr are formed concentrically from the periphery to the inside on the surface of the disk, and each track is divided into 16 sectors Se in the angular direction. Therefore, as for the flexible disk storing the above-mentioned program, data as the aforementioned program is stored in an area assigned for it on the flexible disk FD.

FIG. 13 C shows a structure for recording and reading out the program on the flexible disk FD. When the program is recorded on the flexible disk FD, the computing system Cs writes in data as the program via a flexible disk drive FDD. When the coding device and the decoding device are constructed in the computing system by the program on the flexible disk, the picture coding method and a picture decoding method as the program is read out from the flexible disk drive and then transferred to the computing system Cs.

The above explanation is made on an assumption that a storing medium is a flexible disk, but the same processing can also be performed using an optical disk. In addition, the storing medium is not limited to a flexible disk and an optical disk, but any other medium such as an IC card and a ROM cassette capable of recording a program can be used.

The Fourth Embodiment

The following is an explanation of the applications of the picture coding method as well as the picture decoding method as shown in the above-mentioned embodiments, and a system using them.

Figure 14:
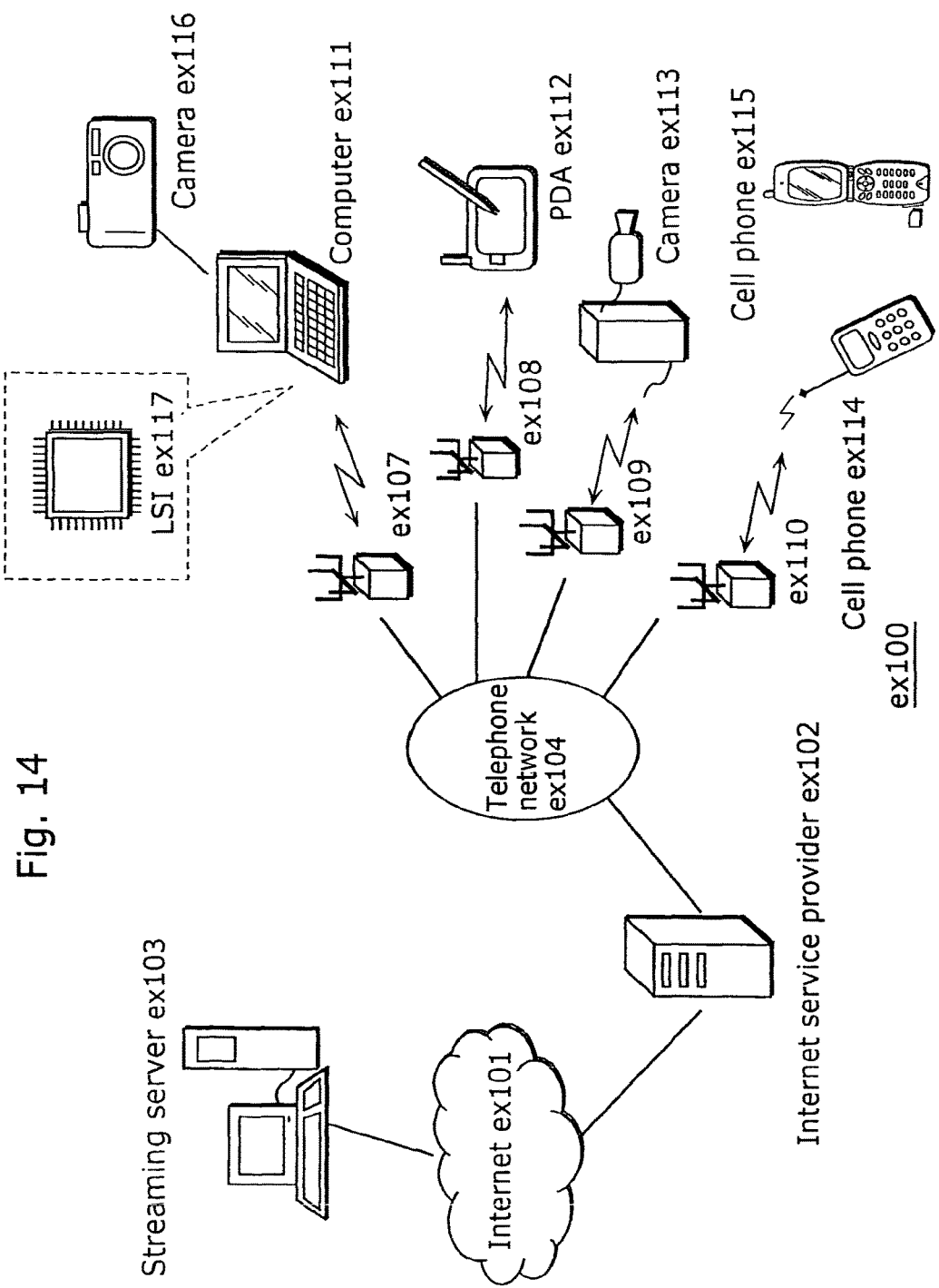
FIG. 14 is a block diagram showing an overall configuration of a content supply system ex100 for realizing content distribution service.

FIG. 14 is a block diagram showing an overall configuration of a content supply system ex100 for realizing content distribution service. The area for providing communication service is divided into cells of desired size, and cell sites ex107~ex110 which are fixed wireless stations are placed in respective cells.

This content supply system ex100 is connected to devices such as Internet ex101, an Internet service provider ex102, a telephone network ex104, as well as a computer ex111, a PDA (Personal Digital Assistant) ex112, a camera ex113, a cell phone ex114 and a cell phone with a camera ex115 via the cell sites ex107~ex110.

However, the content supply system ex100 is not limited to the configuration as shown in FIG. 14 and may be connected to a combination of any of them. Also, each device may be connected directly to the telephone network ex104, not through the cell sites ex107~ex110.

The camera ex113 is a device capable of shooting video such as a digital video camera. The cell phone ex114 may be a cell phone of any of the following system: a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and also the cell site ex109, which realizes a live distribution or the like using the camera ex113 based on the coded data transmitted from the user. Either the camera ex113 or the server which transmits the data may code the data. Also, the picture data shot by a camera ex116 may be transmitted to the streaming server ex103 via the computer ex111. In this case, either the camera ex116 or the computer ex111 may code the picture data. An LSI ex117 included in the computer ex111 or the camera ex116 actually performs coding processing. Software for coding and decoding pictures may be integrated into any type of storage medium (such as a CD-ROM, a flexible disk and a hard disk) that is a recording medium which is readable by the computer ex111 or the like. Furthermore, a cell phone with a camera ex115 may transmit the picture data. This picture data is the data coded by the LSI included in the cell phone ex115.

The content supply system ex100 codes contents (such as a music live video) shot by a user using the camera ex113, the camera ex116 or the like in the same way as shown in the above-mentioned embodiments and transmits them to the streaming server ex103, while the streaming server ex103 makes stream distribution of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each device in this system performs coding or decoding, the picture coding method or the picture decoding method shown in the above-mentioned embodiments can be used.

A cell phone will be explained as an example of the device.

Figure 15:
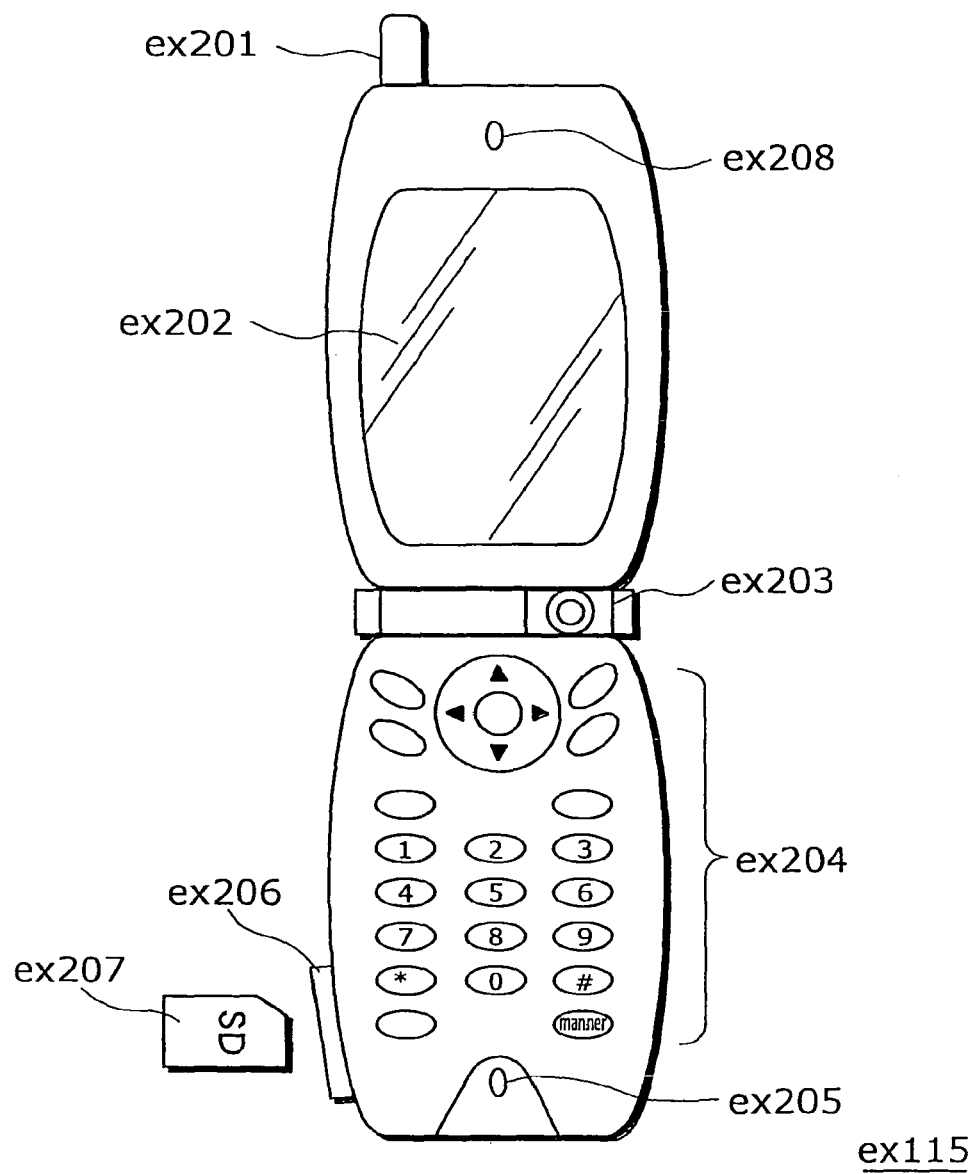
FIG. 15 is a diagram showing the cell phone ex115 using the picture coding method and the picture decoding method explained in the above-mentioned embodiments.

FIG. 15 is a diagram showing the cell phone ex115 using the picture coding method and the picture decoding method explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, a audio output unit ex208 such as a speaker for outputting audio, a audio input unit ex205 such as a microphone for inputting audio, a storage medium ex207 for storing coded or decoded data such as data of moving or still pictures shot by the camera, data of received e-mails and that of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is a nonvolatile memory electrically erasable from and rewritable to a plastic case such as an SD card.

Next, the cell phone ex115 will be explained with reference to FIG. 16. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a read/write unit ex307, a modem circuit unit ex306 and a audio processing unit ex305 via a synchronous bus ex313.

When a call-end key or a power key is turned ON by a user's operation, the power supply circuit unit ex310 supplies respective units with power from a battery pack so as to activate the camera attached digital cell phone ex115 as a ready state.

In the cell phone ex115, the audio processing unit ex305 converts the audio signals received by the audio input unit ex205 in conversation mode into digital audio data under the control of the main control unit ex311 including a CPU, ROM and RAM, the modem circuit unit ex306 performs spread spectrum processing of the digital audio data, and the communication circuit unit ex301 performs digital-to-analog conversion and frequency conversion of the data, so as to transmit it via the antenna ex201. Also, in the cell phone ex115, the communication circuit unit ex301 amplifies the data received by the antenna ex201 in conversation mode and performs frequency conversion and analog-to-digital conversion to the data, the modem circuit unit ex306 performs inverse spread spectrum processing of the data, and the audio processing unit ex305 converts it into analog audio data, so as to output it via the audio output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the picture coding apparatus as explained in the present invention, compresses and codes the picture data supplied from the camera unit ex203 by the coding method used for the picture coding apparatus as shown in the above-mentioned first embodiment so as to transform it into coded picture data, and sends it out to the multiplexing/demultiplexing unit ex308. At this time, the cell phone ex115 sends out the audio received by the audio input unit ex205 during the shooting with the camera unit ex203 to the multiplexing/demultiplexing unit ex308 as digital audio data via the audio processing unit ex305.

The multiplexing/demultiplexing unit ex308 multiplexes the coded picture data supplied from the picture coding unit ex312 and the audio data supplied from the audio processing unit ex305 using a predetermined method, then the modem circuit unit ex306 performs spread spectrum processing of the multiplexed data obtained as a result of the multiplexing, and lastly the communication circuit unit ex301 performs digital-to-analog conversion and frequency conversion of the data for the transmission via the antenna ex201.

As for receiving data of a moving picture file which is linked to a Web page or the like in data communication mode, the modem circuit unit ex306 performs inverse spread spectrum processing of the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 separates the multiplexed data into a bit stream of picture data and that of audio data, and supplies the coded picture data to the picture decoding unit ex309 and the audio data to the audio processing unit ex305, respectively, via the synchronous bus ex313.

Next, the picture decoding unit ex309, including the picture decoding apparatus as explained in the above-mentioned invention, decodes the bit stream of picture data using the decoding method corresponding to the coding method as shown in the above-mentioned embodiments to generate reproduced moving picture data, and supplies this data to the display unit ex202 via the LCD control unit ex302, and thus the picture data included in the moving picture file linked to a Web page, for instance, is displayed. At the same time, the audio processing unit ex305 converts the audio data into analog audio data, and supplies this data to the audio output unit ex208, and thus the audio data included in the moving picture file linked to a Web page, for instance, is reproduced.

The present invention is not limited to the above-mentioned system as such ground-based or satellite digital broadcasting has been in the news lately and at least either the picture coding apparatus or the picture decoding apparatus described in the above-mentioned embodiments can be incorporated into a digital broadcasting system as shown in FIG. 17. More specifically, a bit stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes the bit stream for reproduction. The picture decoding apparatus as shown in the above-mentioned embodiment can be implemented in the reproducing apparatus ex403 for reading out and decoding the bit stream recorded on a storage medium ex402 that is a recording medium such as CD and DVD. In this case, the reproduced video signals are displayed on a monitor ex404. It is also conceivable to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, instead of in the set top box. Also, a car ex412 having an antenna ex411 can receive signals from the satellite ex410 or the cell site ex107 for reproducing moving pictures on a display device such as a car navigation system ex413 set in the car ex412.

Furthermore, the picture coding apparatus as shown in the above-mentioned embodiments can code picture signals and record them on a recording medium. As a specific example, a recorder ex420 such as a DVD recorder for recording picture signals on a DVD disk ex421, a disk recorder for recording them on a hard disk, can be used. They can be recorded on an SD card ex422. If the recorder ex420 includes the picture decoding apparatus as shown in the above-mentioned embodiments, the picture signals recorded on the DVD disk ex421 or the SD card ex422 can be reproduced for display on the monitor ex408.

Figure 16:
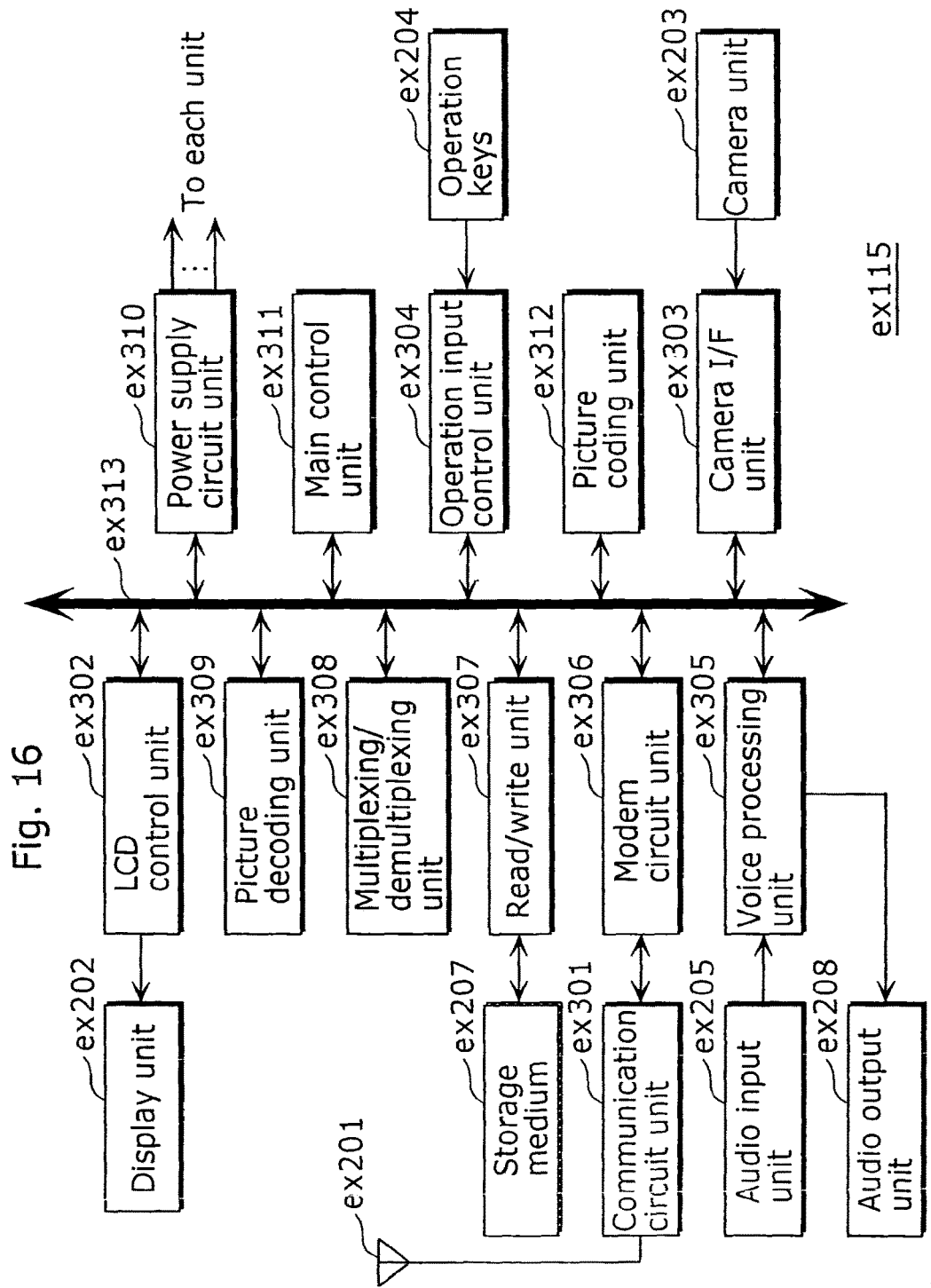
FIG. 16 is a diagram showing a structure of a cell phone.

As for the structure of the car navigation system ex413, the structure without the camera unit ex203, the camera interface unit ex303 and the picture coding unit ex312, which are components shown in FIG. 16, is conceivable. The same applies for the computer ex111, the television (receiver) ex401 and others.

In addition, three types of implementations can be conceived for a terminal such as the above-mentioned cell phone ex114; a sending/receiving terminal implemented with both a coder and a decoder, a sending terminal implemented with a coder only, and a receiving terminal implemented with a decoder only.

As described above, it is possible to use the picture coding method or the picture decoding method described in the above-mentioned embodiments for any of the above-mentioned devices and systems, and by using this method, the effects described in the above-mentioned embodiments can be obtained.

The picture coding apparatus according to the present invention is useful as the picture coding apparatus that is included in a personal computer and a PDA that are equipped with a communication function, a digital broadcasting station, a cell phone and the like.

The picture decoding apparatus according to the present invention is useful as the picture decoding apparatus that is included in a personal computer and a PDA with the communication function, an STB that receives digital broadcast, cell phone and the like.

The invention claimed is:

1. A decoding method comprising:
   demultiplexing audio data and video data from multiplexed data in which the audio data and the video data are multiplexed;
   decoding the demultiplexed audio data; and
   decoding the demultiplexed video data to generate a predictive image of a current block included in a current macroblock of a current picture,
   wherein the method further comprises:
      obtaining a motion vector of a block for which motion compensation has been performed, the block being included in a co-located block, the co-located block being included in a co-located macroblock, the co-located macroblock being included in a picture different from the current picture, the block being located in a corner of the co-located macroblock;
      determining a motion vector of the current block to be "0", when a size of the obtained motion vector is in a predetermined range;
      determining the motion vector of the current block using a motion vector of an adjacent macroblock which is located adjacent to the current macroblock, when the size of the obtained motion vector is beyond the predetermined range; and
      performing motion compensation for the current block to generate the predictive image of the current block by using the determined motion vector.

2. The decoding method according to claim 1, wherein the predetermined range is a range of −1 to 1.

3. The decoding method according to claim 2, wherein the size of the block is smaller than the size of the current block, and
the size of the co-located block is the same as the current block.

4. The decoding method according to claim 3, wherein the current macroblock is included in a B picture,
the co-located macroblock is included in the picture subsequent in display order to the current picture, and
the motion vector of the current block is determined using motion vectors of adjacent macroblocks which are located adjacent to the current macroblock when the size of the obtained motion vector is beyond the predetermined range of −1 to 1.

5. The decoding method according to claim 4,
wherein a size of the current macroblock and the co-located macroblock is 16 pixels×16 pixels,
a size of the current block is 8 pixels×8 pixels, and
a size of the block is 4 pixels×4 pixels.

6. The decoding method according to claim 5, wherein the motion vector of the block located in the corner of the co-located macroblock is obtained when the co-located block comprises a plurality of blocks for which motion compensation has been performed.

7. A decoding apparatus coupled to a memory and comprising processing circuitry, wherein the decoding apparatus, in operation:
   demultiplexes audio data and video data from multiplexed data in which audio data and video data are multiplexed;
   decodes the demultiplexed audio data; and
   decodes the demultiplexed video data to generate a predictive image of a current block included in a current macroblock of a current picture,
   wherein the decoding apparatus, in operation, further:
      obtains a motion vector of a block for which motion compensation has been performed, the block being included in a co-located block, the co-located block being included in a co-located macroblock, the co-located macroblock being included in a picture different from the current picture, the block being located in the corner of the co-located macroblock;

determines a motion vector of the current block to be "0", when a size of the obtained motion vector is in a predetermined range;

determines the motion vector of the current block using a motion vector of an adjacent macroblock which is located adjacent to the current macroblock, when the size of the obtained motion vector is beyond the predetermined range; and performs motion compensation for the current block to generate the predictive image, by using the determined motion vector.

8. The decoding apparatus according to claim 7, wherein the predetermined range is a range of −1 to 1.

9. The decoding apparatus according to claim 8, wherein the size of the block is smaller than the size of the current block, the size of the co-located block is the same as the current block.

10. The decoding apparatus according to claim 9, wherein the current macroblock is included in a B picture, and the co-located macroblock is included in the picture subsequent in display order to the current picture, and the motion vector of the current block is determined using motion vectors of adjacent macroblocks which are located adjacent to the current macroblock when the size of the obtained motion vector is beyond the predetermined range.

11. The decoding apparatus according to claim 10, wherein a size of the current macroblock and the co-located macroblock is 16 pixels×16 pixels, a size of the current block is 8 pixels×8 pixels, and a size of the block is 4 pixels×4 pixels.

12. The decoding apparatus according to claim 11, wherein the decoding apparatus, in operation, obtains the motion vector of the block located in the corner of the co-located macroblock when the co-located block comprises a plurality of blocks for which motion compensation has been performed.

* * * * *